US008245157B2

(12) United States Patent
Kelly

(10) Patent No.: US 8,245,157 B2
(45) Date of Patent: Aug. 14, 2012

(54) DECISION MAKING AND PLANNING SYSTEM, METHOD, AND SOFTWARE UTILIZING A TAXONOMIC TABLE OF IRREDUCIBLE STRATEGIES OR PLAYS

(76) Inventor: Alan D. Kelly, Potomac, MD (US)

(*) Notice: Subject to any disclaimer, the term of this patent is extended or adjusted under 35 U.S.C. 154(b) by 1014 days.

(21) Appl. No.: 11/889,861

(22) Filed: Aug. 17, 2007

(65) Prior Publication Data
US 2008/0216018 A1 Sep. 4, 2008

Related U.S. Application Data

(60) Provisional application No. 60/839,410, filed on Aug. 23, 2006.

(51) Int. Cl.
*G06F 3/048* (2006.01)
*G06Q 10/00* (2012.01)
*A63F 9/24* (2006.01)
*G06F 17/00* (2006.01)
(52) U.S. Cl. .......... 715/835; 705/1.1; 463/1; 463/9
(58) Field of Classification Search .......... 715/835; 705/1.1; 463/1, 9
See application file for complete search history.

(56) References Cited

U.S. PATENT DOCUMENTS

| | | | | |
|---|---|---|---|---|
| 5,774,121 A | * | 6/1998 | Stiegler | 715/769 |
| 5,838,317 A | * | 11/1998 | Bolnick et al. | 715/764 |
| 5,963,910 A | * | 10/1999 | Ulwick | 705/7 |
| 6,764,401 B1 | | 7/2004 | Akatsuka | |
| 6,868,525 B1 | | 3/2005 | Szabo | |
| 6,934,911 B2 | * | 8/2005 | Salmimaa et al. | 715/744 |
| 7,155,158 B1 | * | 12/2006 | Iuppa et al. | 434/350 |
| 7,380,217 B2 | * | 5/2008 | Gvelesiani | 715/804 |
| 2003/0069868 A1 | * | 4/2003 | Vos | 706/45 |
| 2003/0069869 A1 | * | 4/2003 | Gronau et al. | 706/46 |
| 2003/0182177 A1 | * | 9/2003 | Gallagher et al. | 705/10 |
| 2003/0234772 A1 | * | 12/2003 | Zhang et al. | 345/177 |
| 2004/0215546 A1 | * | 10/2004 | Nelson | 705/36 |
| 2006/0242004 A1 | * | 10/2006 | Yaskin et al. | 705/11 |
| 2006/0294035 A1 | * | 12/2006 | Siegel et al. | 706/45 |
| 2007/0207846 A1 | * | 9/2007 | Burak et al. | 463/9 |
| 2008/0027779 A1 | * | 1/2008 | Kirwan | 705/8 |

OTHER PUBLICATIONS

Heidi V. Anderson "How to . . . use the whiteboard in NetMeeting" Sep. 1998 vol. 6 Issue 9 3 pages.*

* cited by examiner

*Primary Examiner* — Adam M Queler
*Assistant Examiner* — Andrea Long
(74) *Attorney, Agent, or Firm* — Bacon & Thomas, PLLC

(57) ABSTRACT

A decision-making and planning system and method, which may be implemented as a website, enables a decision maker to formulate strategies and tactics divides potential courses of action into discrete units called "plays" and "surrogates," and presents the plays and surrogates as symbols or icons organized into a taxonomic table, with definitions and information useful in selecting the plays associated with and accessible through the symbols or icons. The decision-maker selects plays from the table and places symbols or icons representing the plays on a template or whiteboard. The result is an analysis or map of strategies, including a sequence of plays and/or surrogates and corresponding information, that can be saved, edited, or published.

48 Claims, 52 Drawing Sheets

Screen image of The Playmaker's Table and its associated classes, subclasses, play types and surrogates.

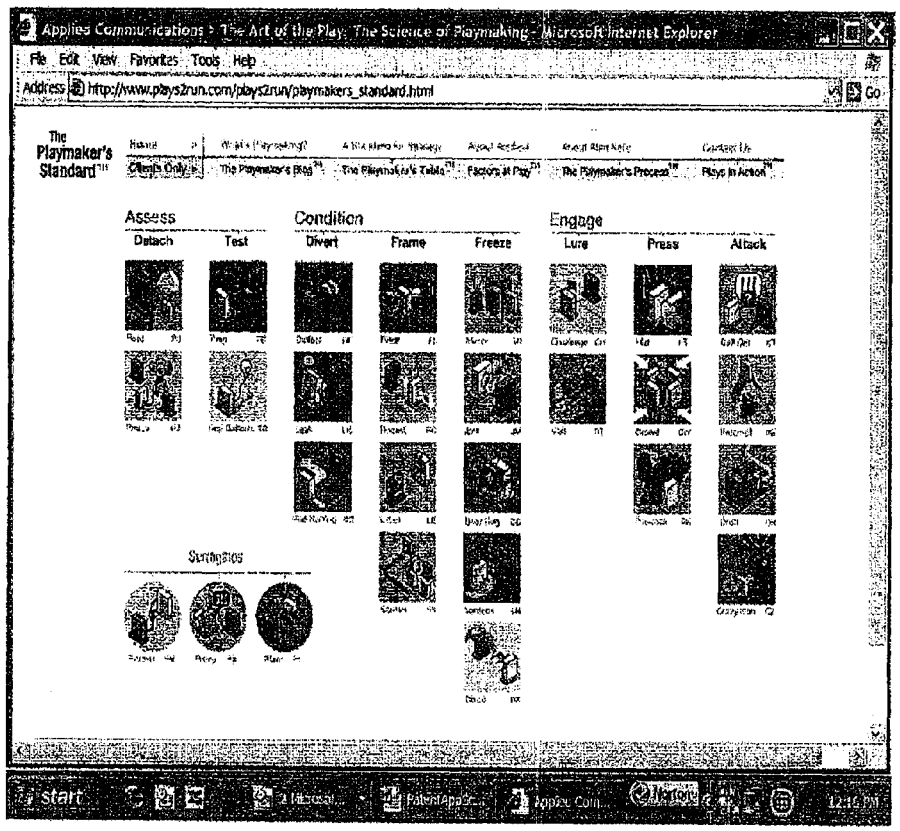
FIG. 1 Screen image of The Playmaker's Table and its associated classes, subclasses, play types and surrogates.

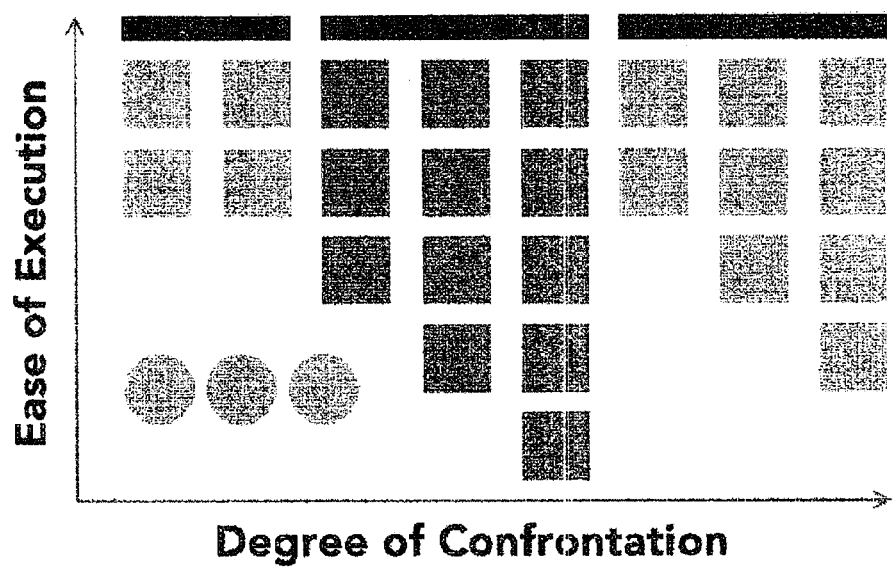
FIG. 2 for information only, The Playmaker's Table is arranged along two axes. Classes, subclasses and play types that are placed toward the right-hand side of the t able gene rally exhibit higher degrees of confrontation. Those that are placed toward the top of the table are generally easier to execute.

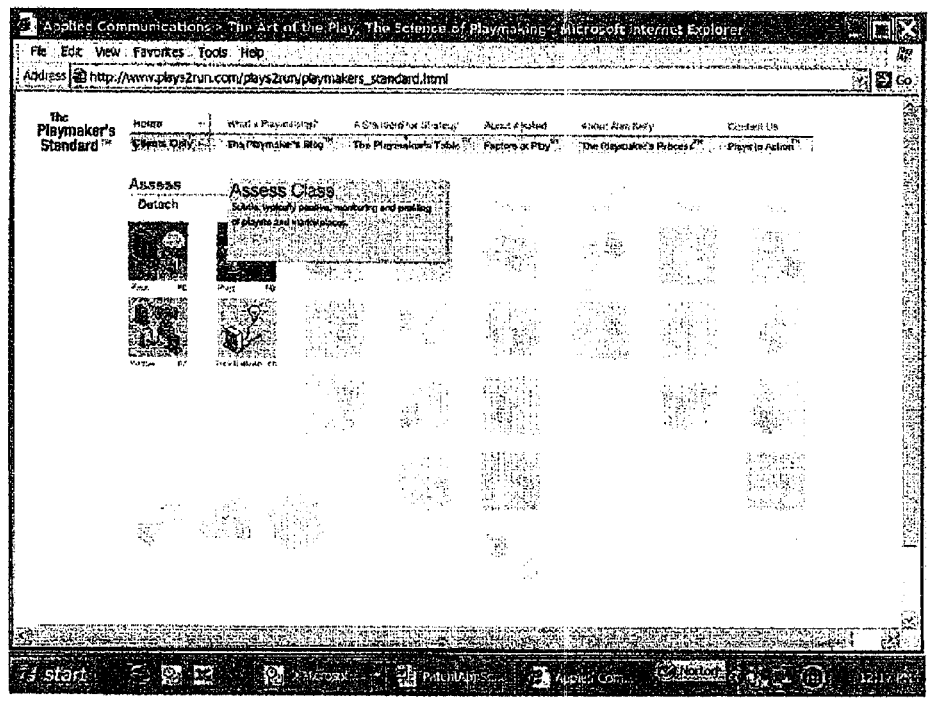
FIG. 3 Screen image of the Assess Class (shows in the foreground with definition) and its associated subclasses and play types of The Playmaker's Table.

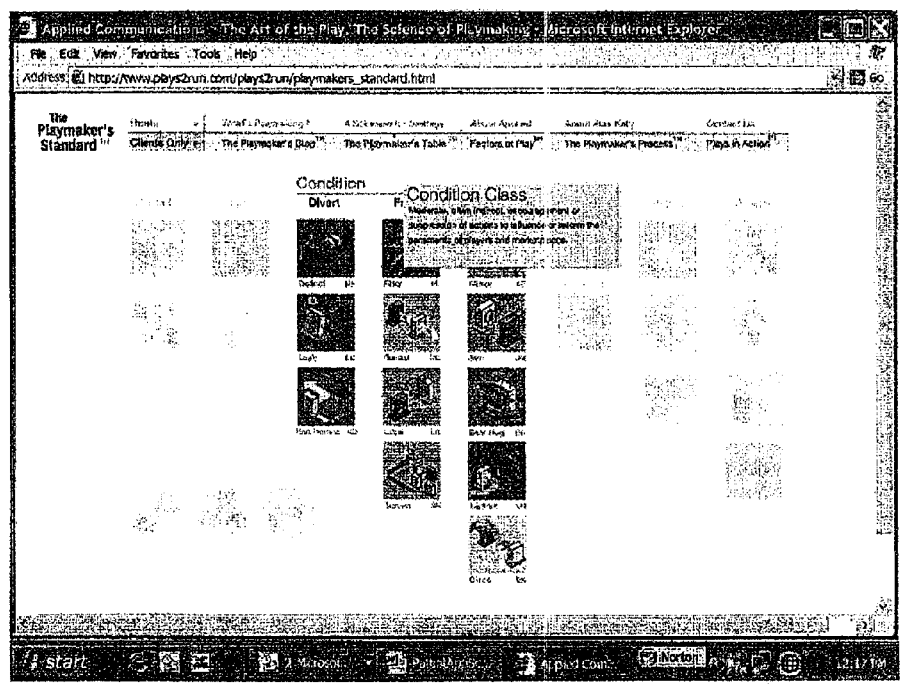
FIG. 4 Screen image of the Condition Class (shown in the foreground with definition) and its associated subclasses and play types of The Playmaker's Table.

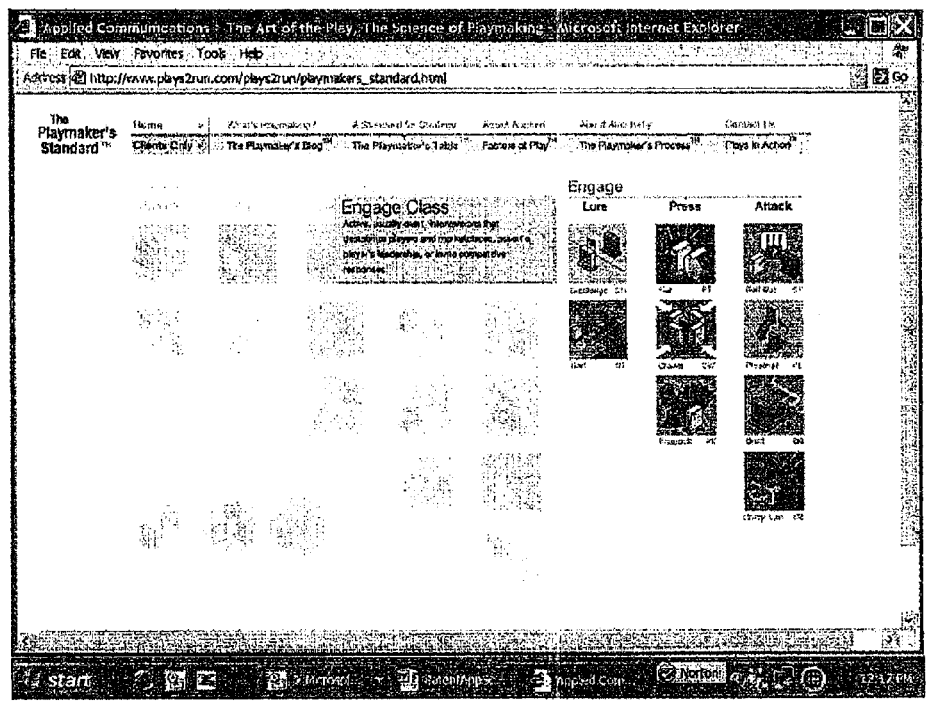
FIG. 5 Screen image of the Engage Class (shown in the foreground with definition) and its associated subclasses and play types of The Playmaker's Table.

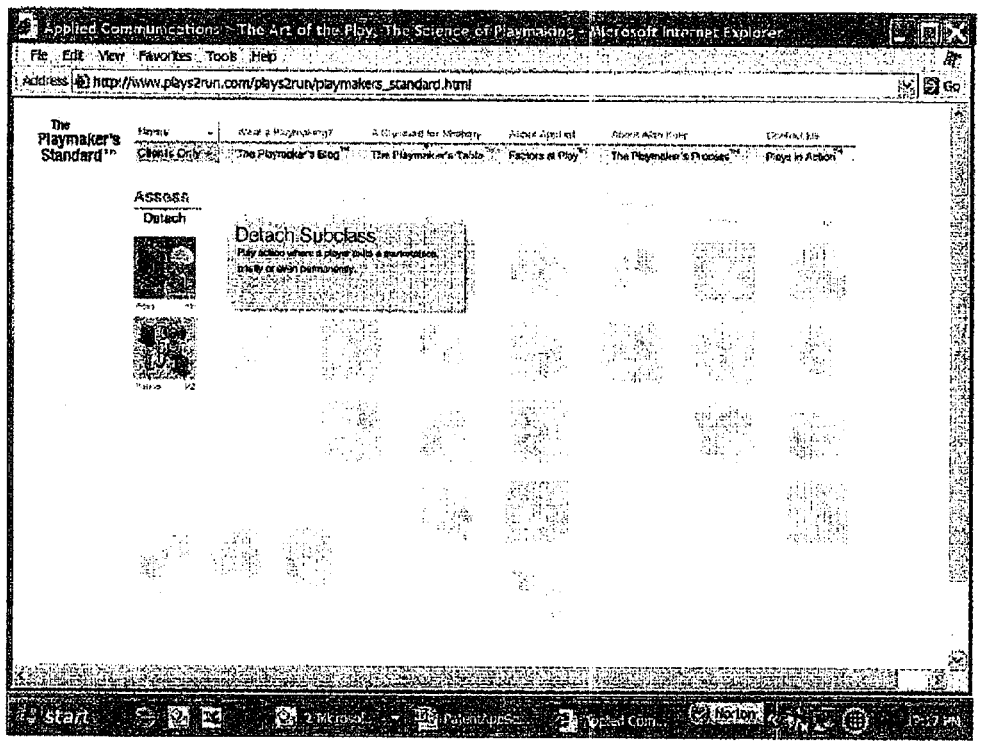
FIG. 6 Screen image of the Detach Subclass (shown in the foreground with definition) and its associated play types of The Playmaker's Table.

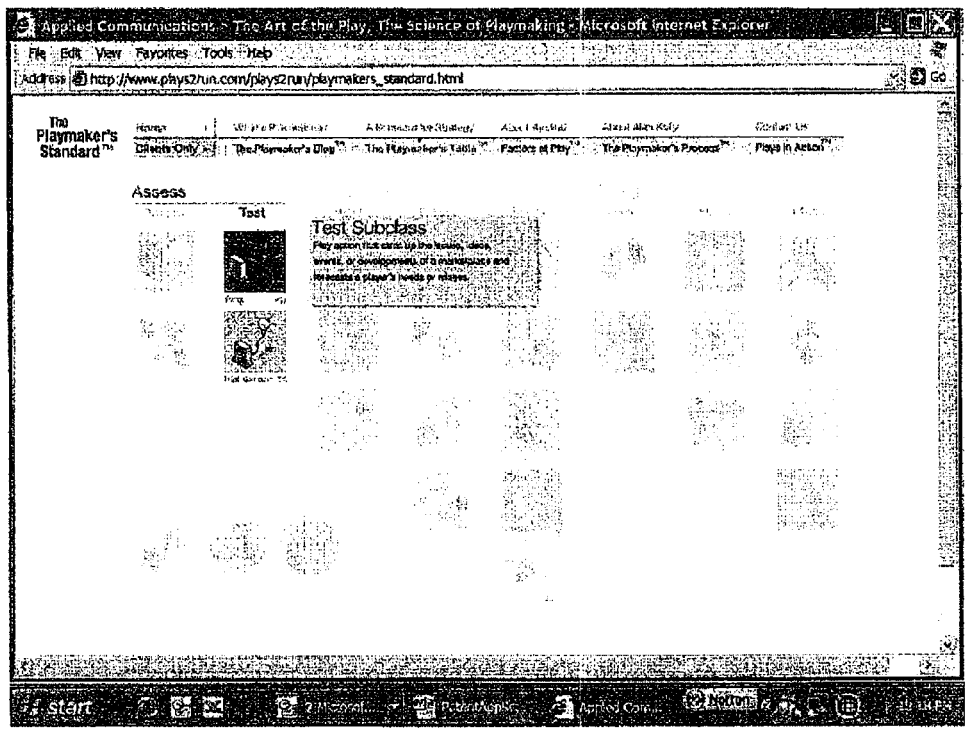
FIG. 7 Screen image of the Test Subclass (shown in the foreground with definition) and its associated play types of The Playmaker's Table.

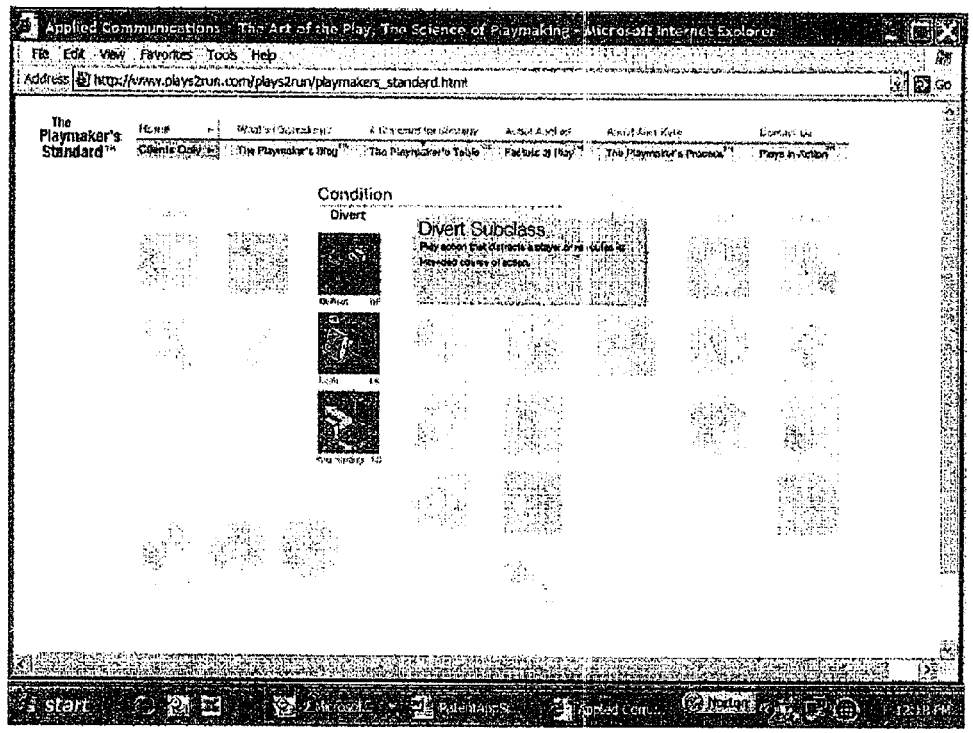
FIG. 8 Screen image of the Divert Subclass (shown in the foreground with definition) and its associated play types of The Playmaker's Table.

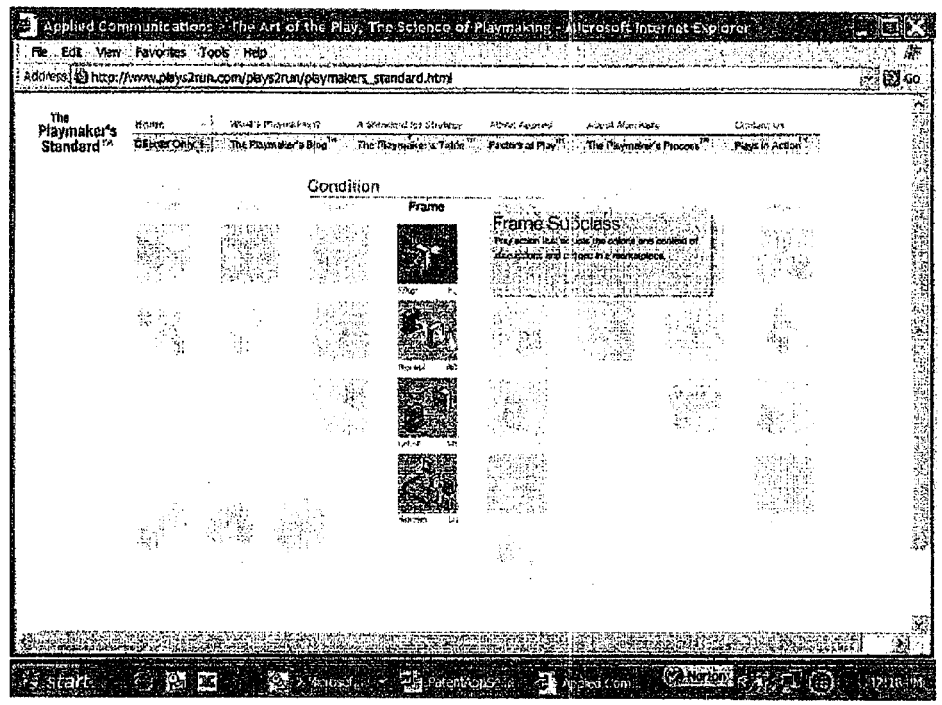
FIG. 9 Screen image of the Frame Subclass (shown in the foreground with definition) and its associated play types of The Playmaker's Table.

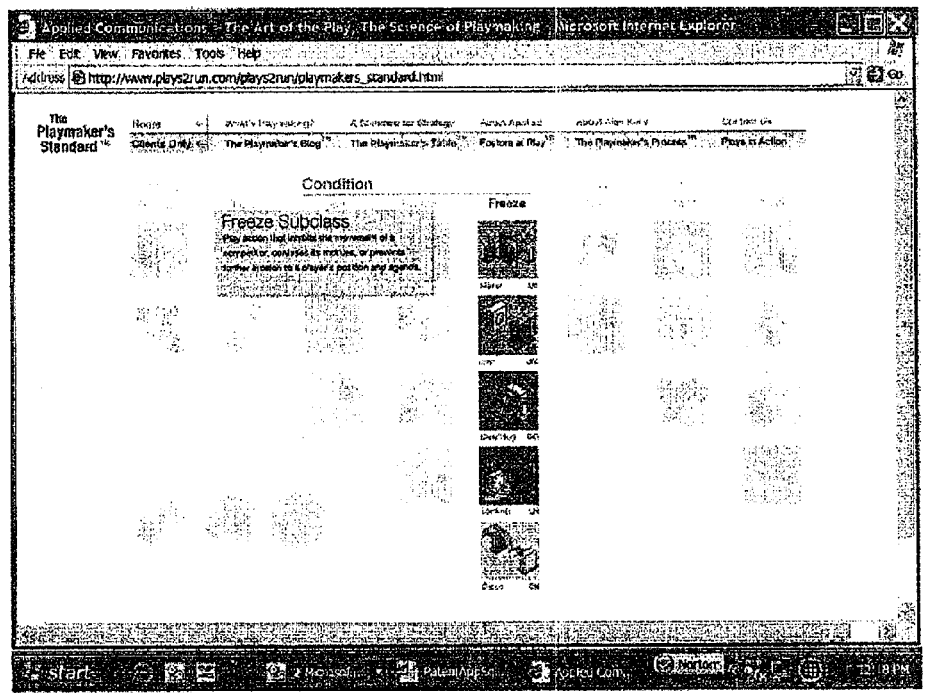
FIG. 10 Screen image of the Freeze Subclass (shown in the foreground with definition) and its associated play types of The Playmaker's Table.

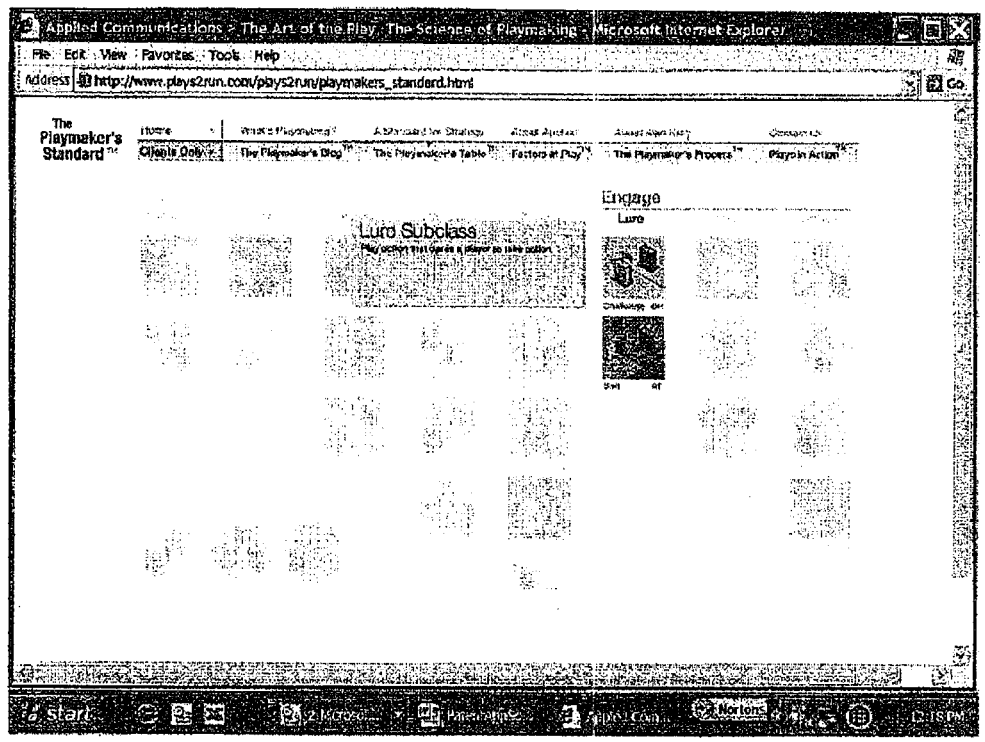
FIG. 11 Screen image of the Lure Subclass (shown in the foreground with definition) and its associated play types of The Playmaker's Table.

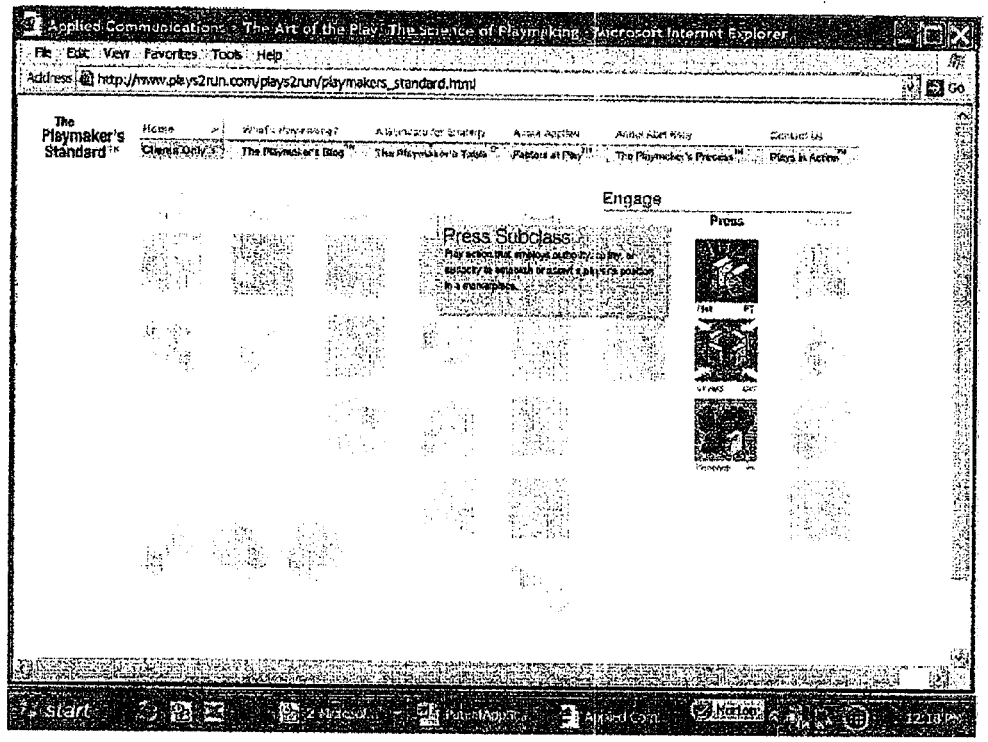
FIG. 12 Screen image of the Press Subclass (shown in the foreground with definition) and its associated play types of The Playmaker's Table.

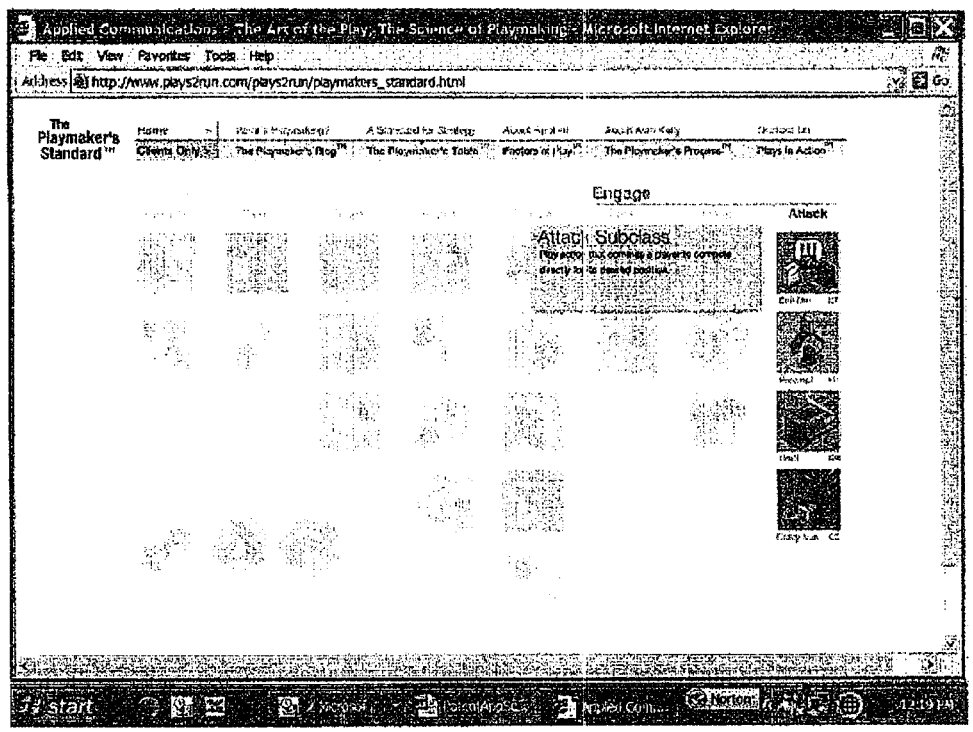
FIG. 13 Screen image of the Attack Subclass (shown in the foreground with definition) and its associated play types of The Playmaker's Table.

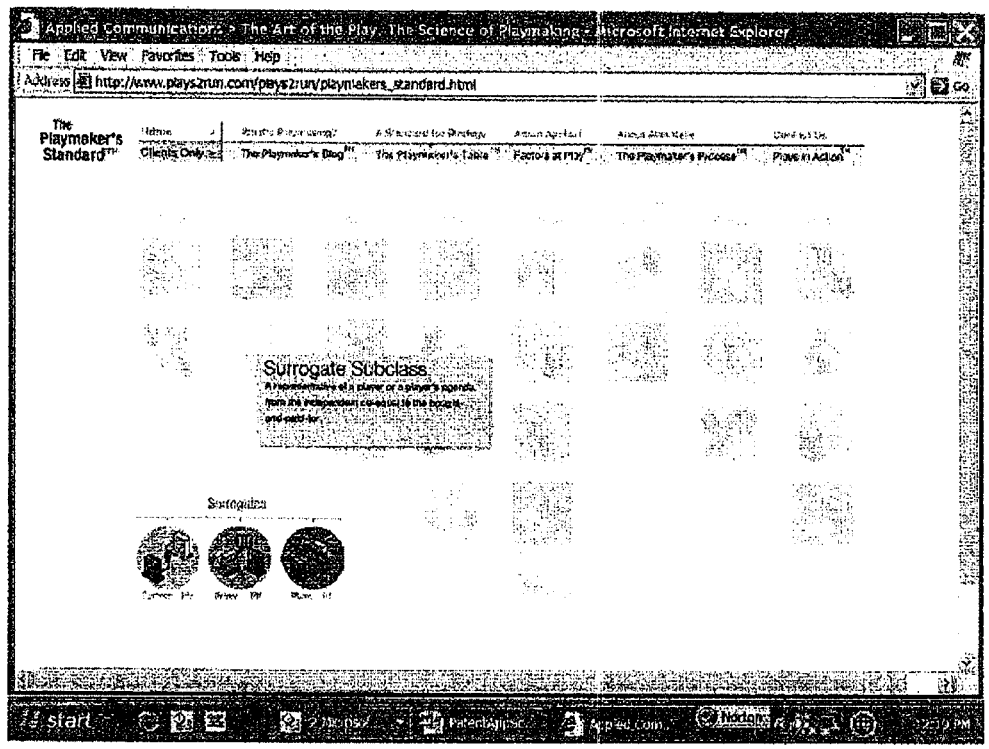
FIG. 14 Screen image of Surrogate plays types (shown in the foreground with definition) of The Playmaker's Table.

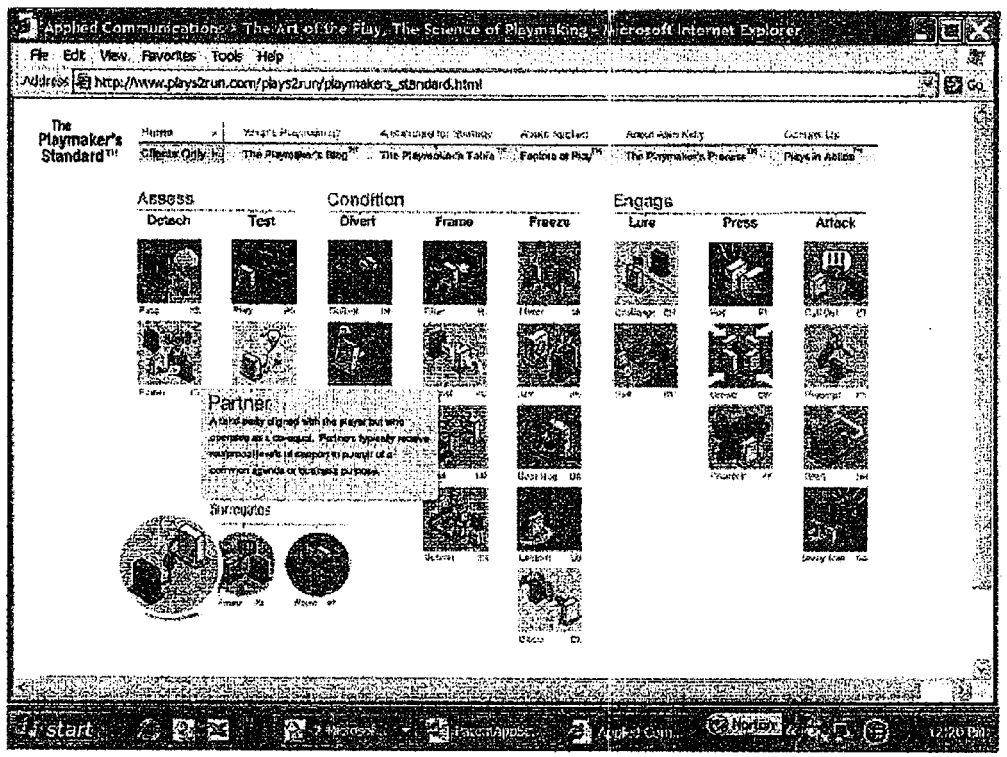
FIG. 15 Screen image of the Partner surrogate (shown enlarged with definition) of The Playmaker's Table.

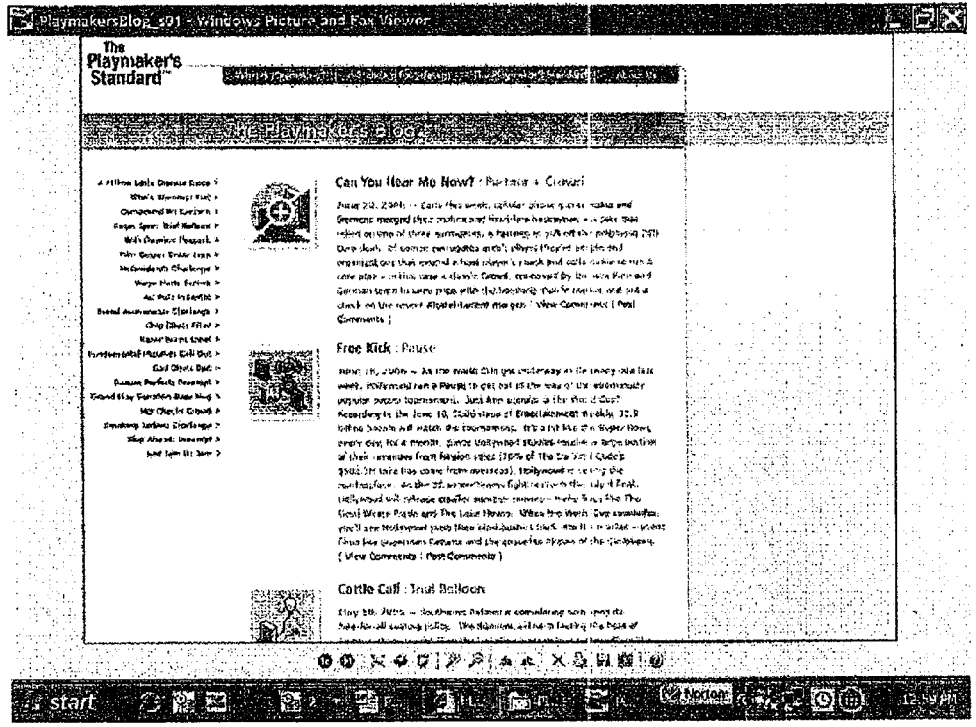
FIG. 16 Screen image of The Playmaker's Blog, a commentary and analysis, available to the public, of plays run in business, politics and popular culture.

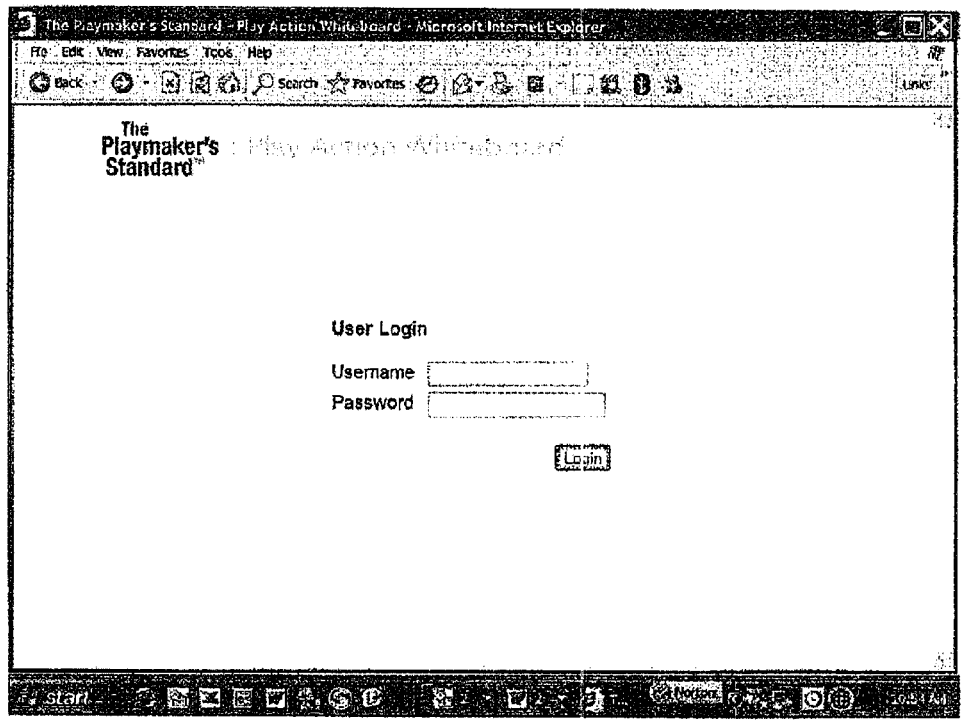
FIG. 17 Screen image of the user login page required for access to the following features and functions of The Playmaker's Standard.

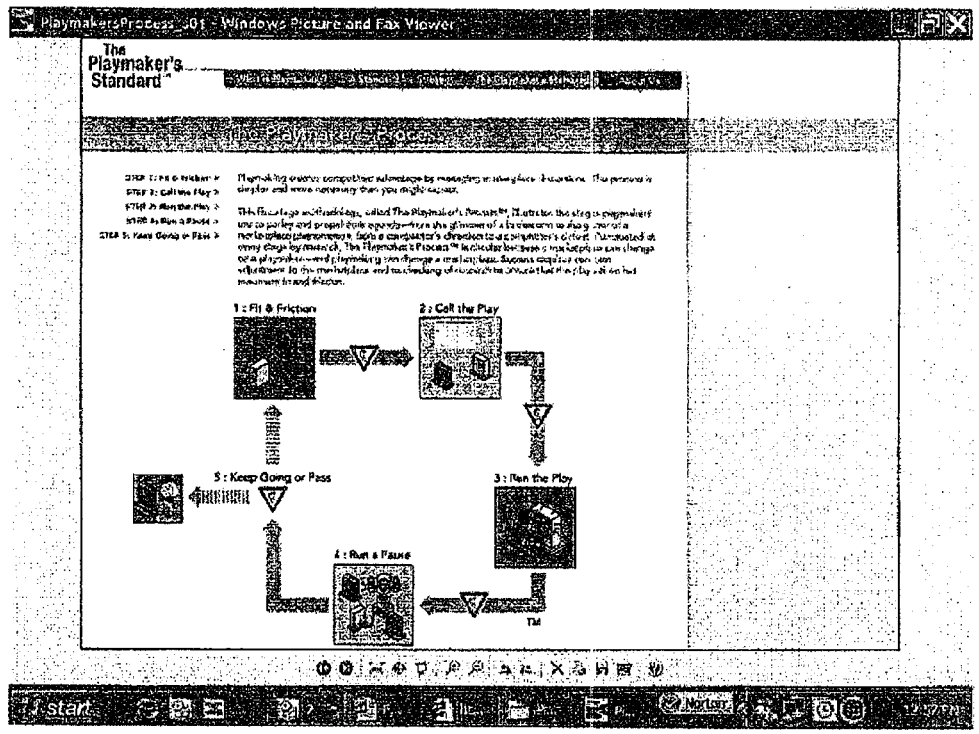
FIG. 18 Screen image of The Playmaker's Process, a five-step methodology, one of three subsystems of The Playmaker's Standard.

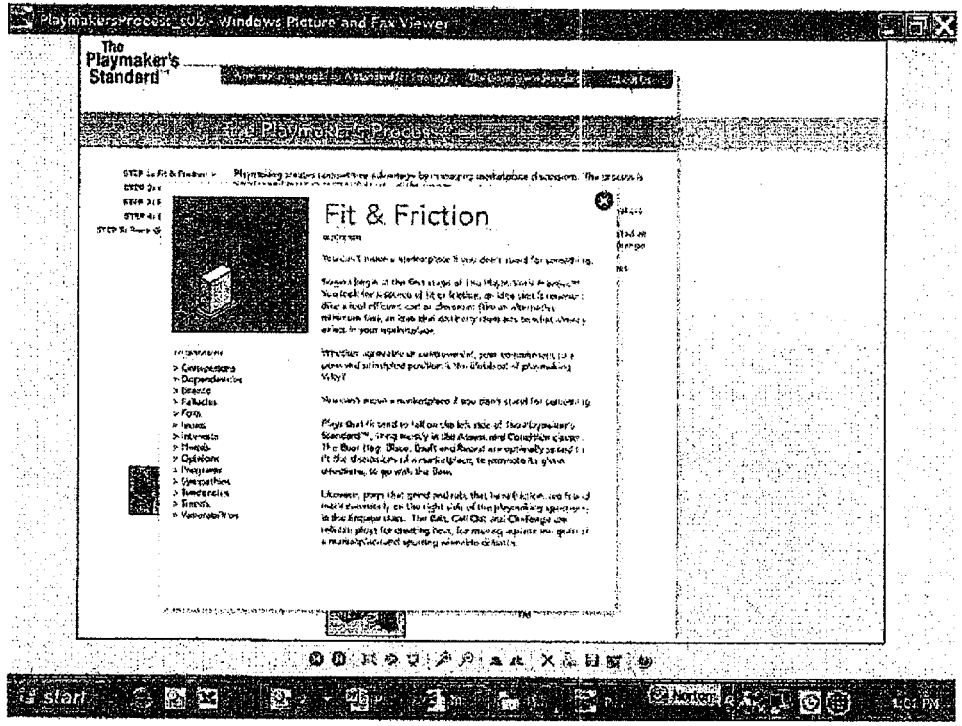
FIG. 19 Screen image of the selected "Step 1" of The Playmaker's Process. Similar detail is shown when a user selects Steps 2 - 5.

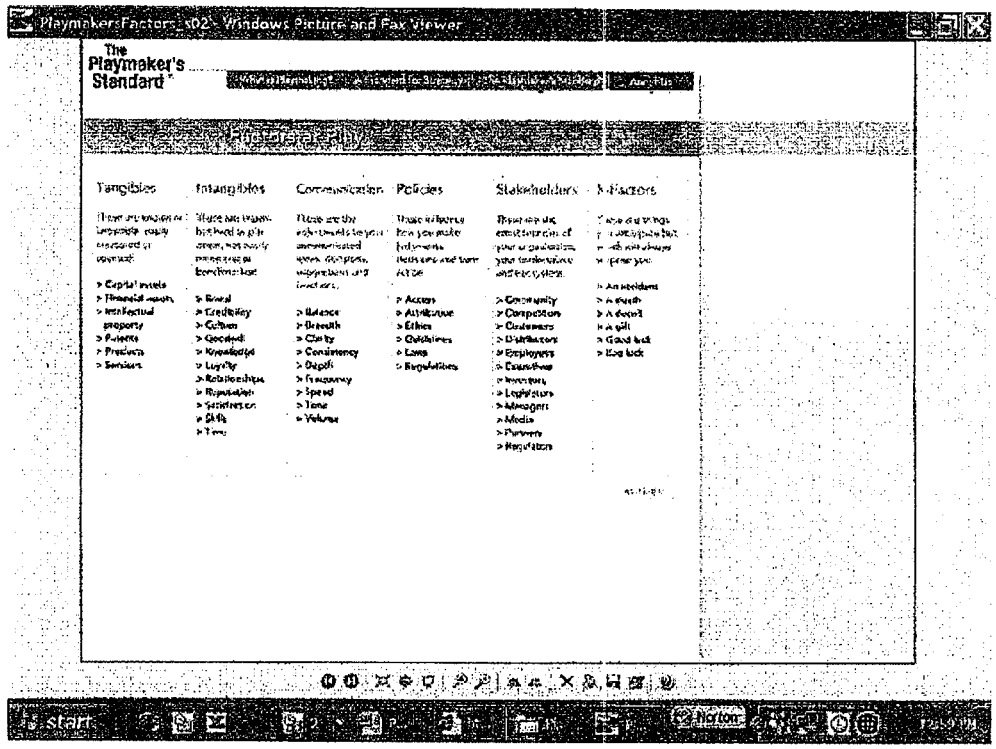
FIG. 20 Screen image of Factors at Play, one of three subsystems of The Playmaker's Standard.

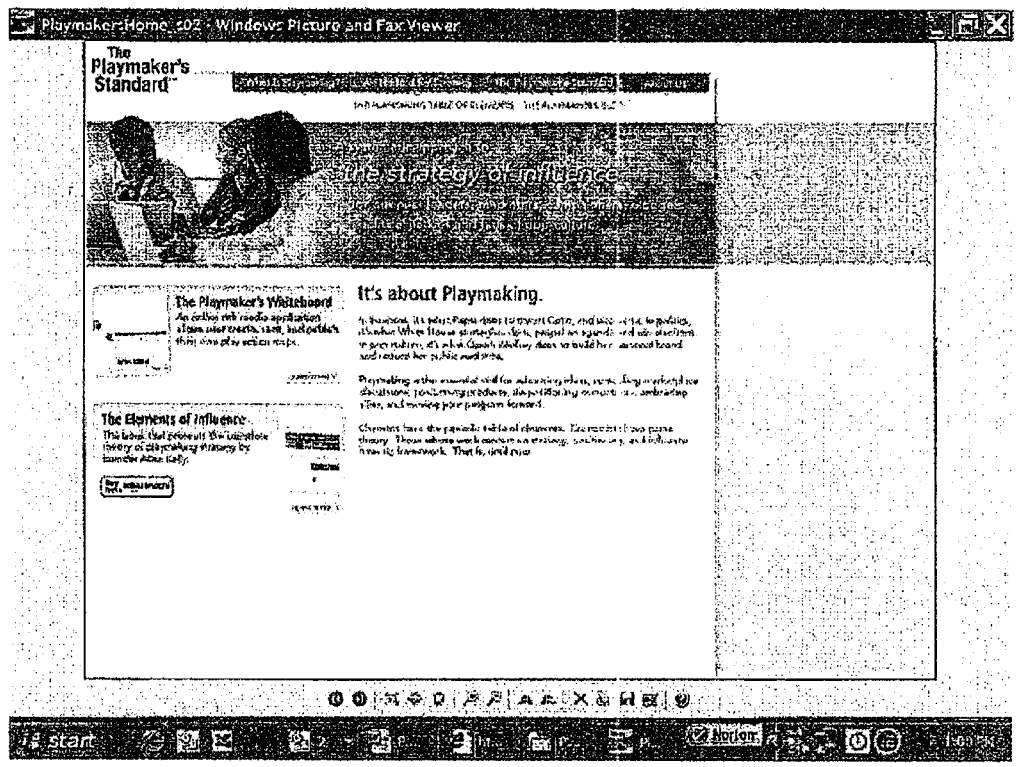
FIG. 21 Screen image of the prototype home page of The Playmaker's Standard.

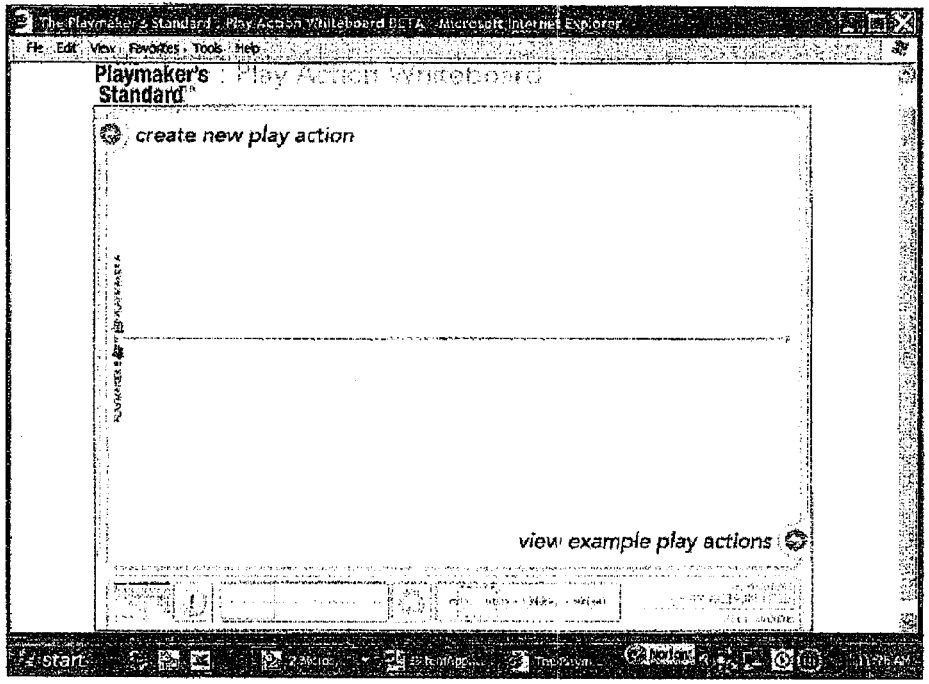

FIG. 22 Screen image from the prototype Play Action Whiteboard, a web tool of The Playmaker's Standard that may be used to create, store, publish, share, and collaboratively update illustrations of the plays that are run in any marketplace. This image is the starting point for the development of a play action map. Note that the playmakers defined on the preceding graphic (e.g., "Playmaker A"), are not placed at the beginning of the time line.

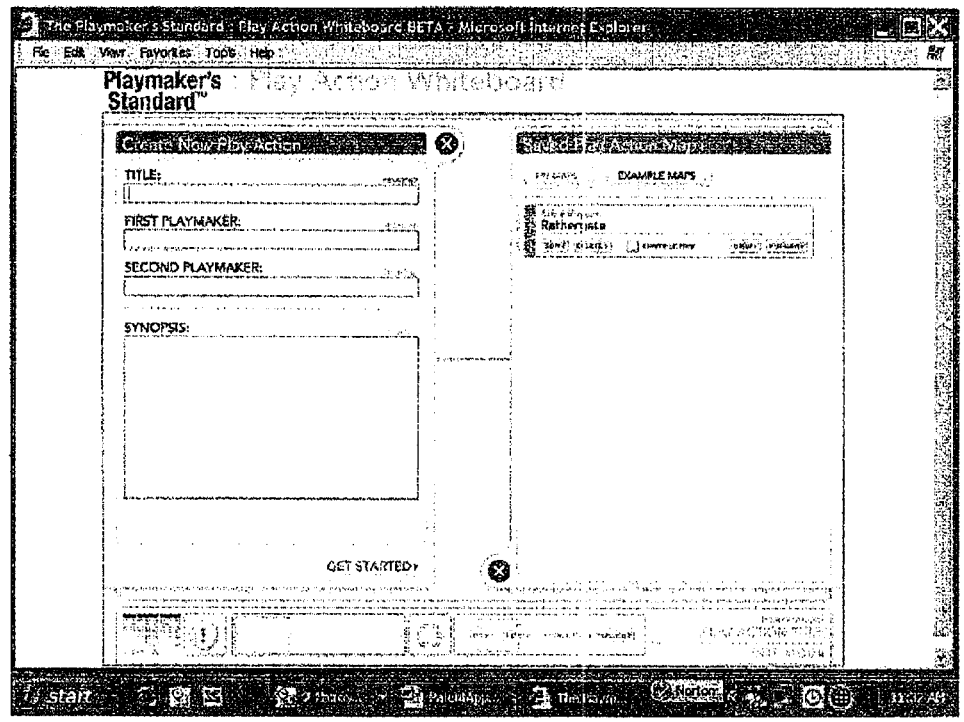
FIG. 23 Screen image from the prototype The Play Action Whiteboard displaying initial "slide-in" pages for creating a new play action (shown on left) and retrieving play action maps (shown on right).

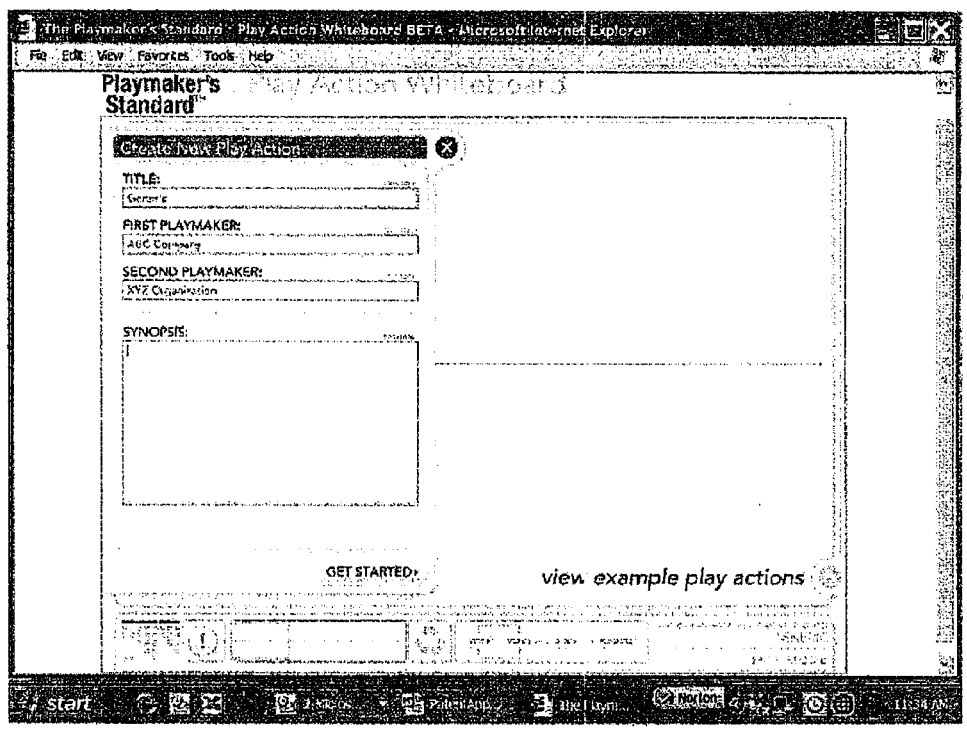
FIG. 24 Screen image of The Play Action Whiteboard where a user is prompted for basic information and terms that will define the play action map under development.

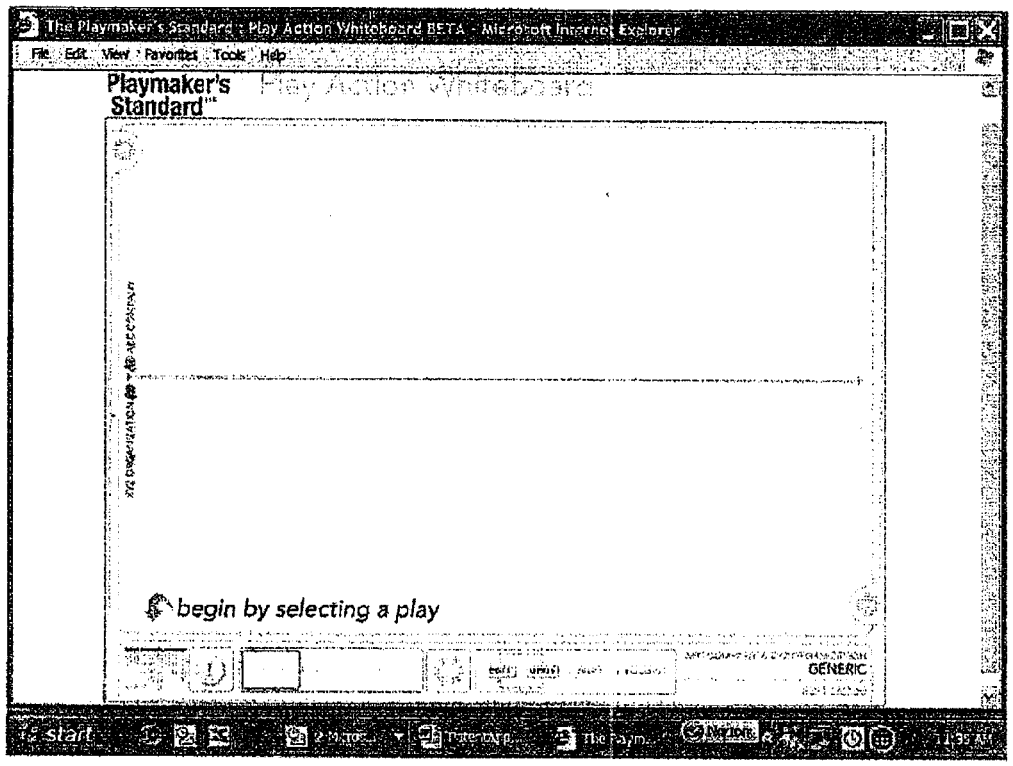
FIG. 25 Having defined the "playmakers" for a play action map (as shown in the preceding graphic), users of The Play Action Whiteboard are then prompted to begin by selecting an "info bubble" (shown on the tool bar above) or, in most cases, a play on a "slide-down" screen (shown on the following graphic).

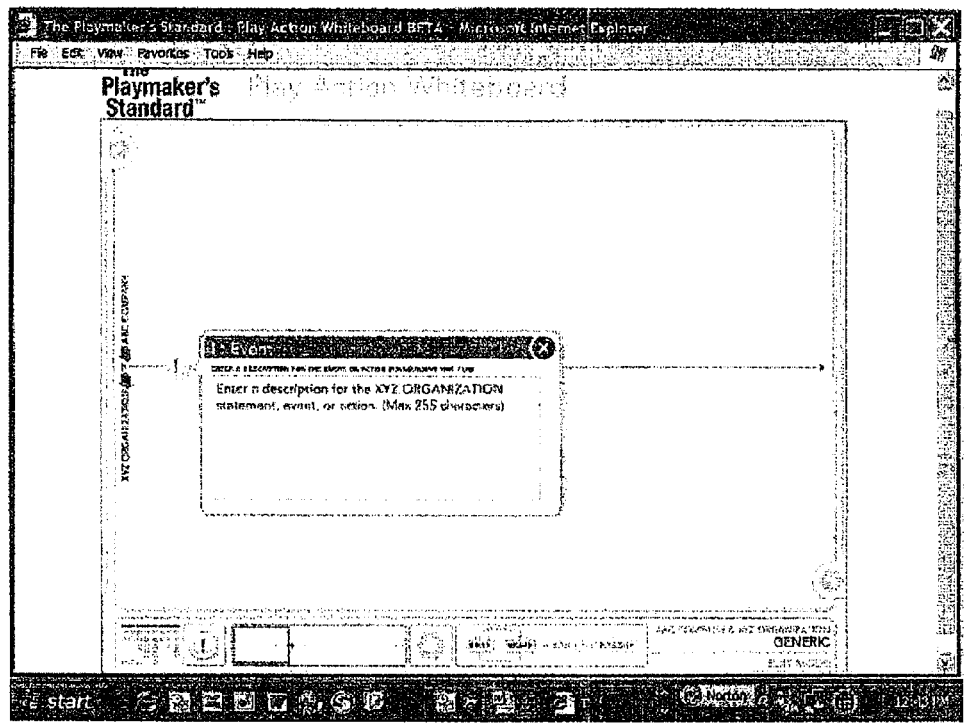
FIG. 26 Screen image showing the initial selection of an "info bubble." These are often selected by a playmaker to set the stage of a play action map and its selected play types.

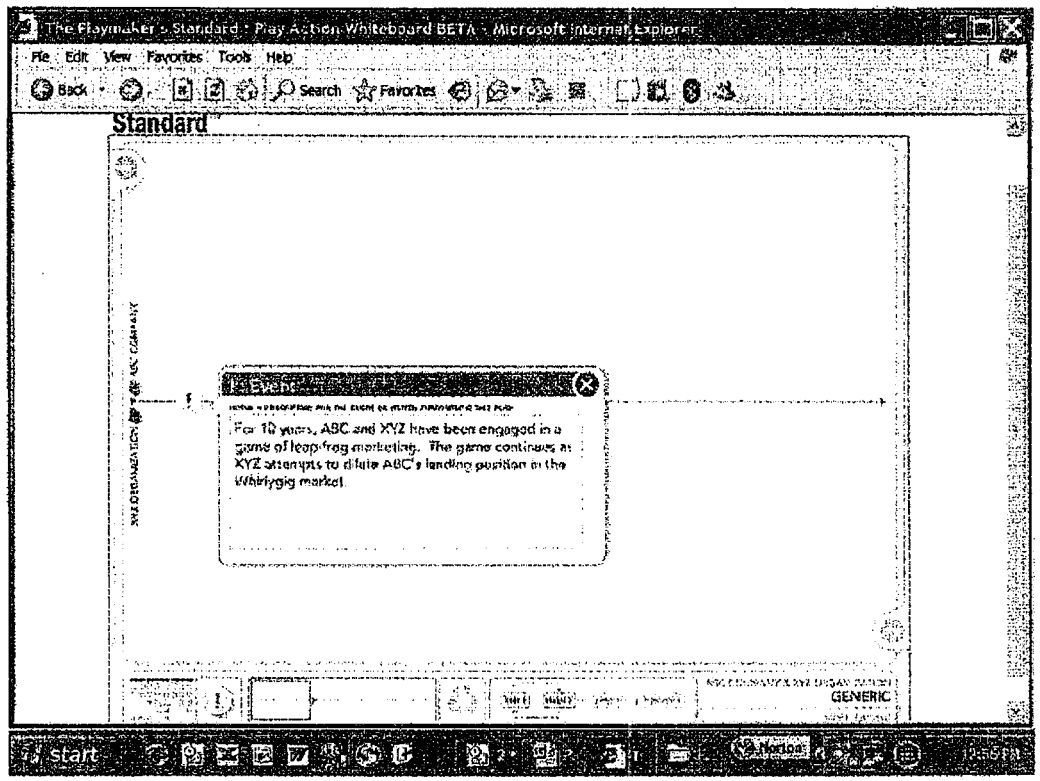
FIG. 27 Screen image showing that The Play Action Whiteboard user has entered descriptive language into the caption of its selected info bubble. The user then proceeds to select the first play by accessing the slide-down screen of The Playmaker's Table (see graphic below).

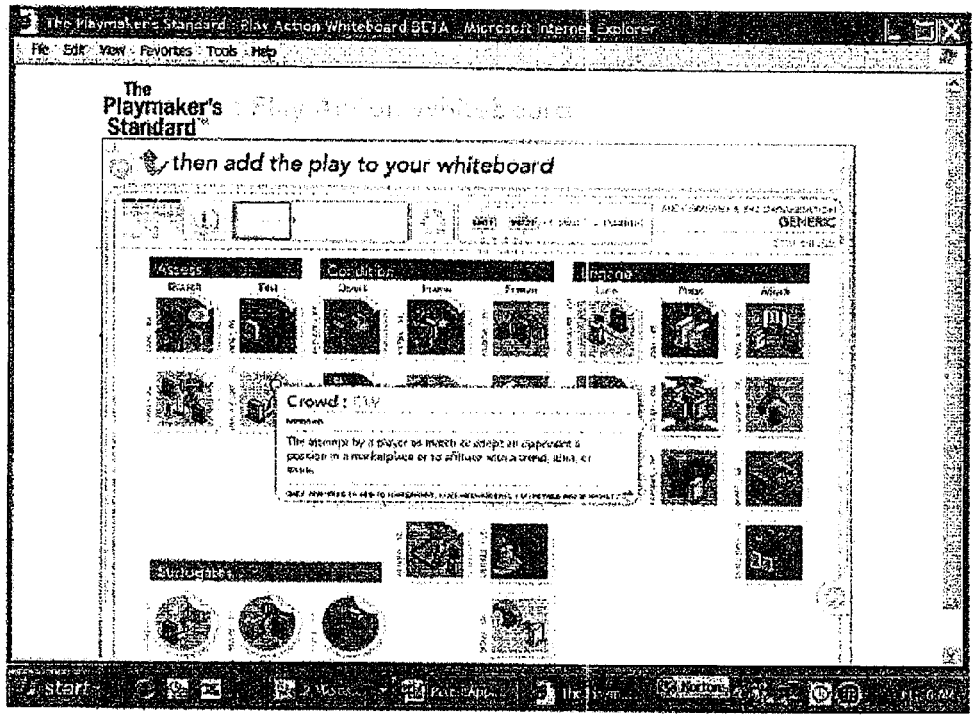

FIG. 28 Screen image of The Playmaker's Table from which a user of The Play Action Whiteboard may identify and apply prospective plays. In this case, the user is considering the selection of a play type called "Crowd." By double clicking any play type icon, the user is offered full details of that play's capabilities and characteristics, including its rated risks and rewards, definition, lists of related plays and terms, case examples, and suggested upsides, downsides, best uses and means for decoding and countering that play (see next seven graphic).

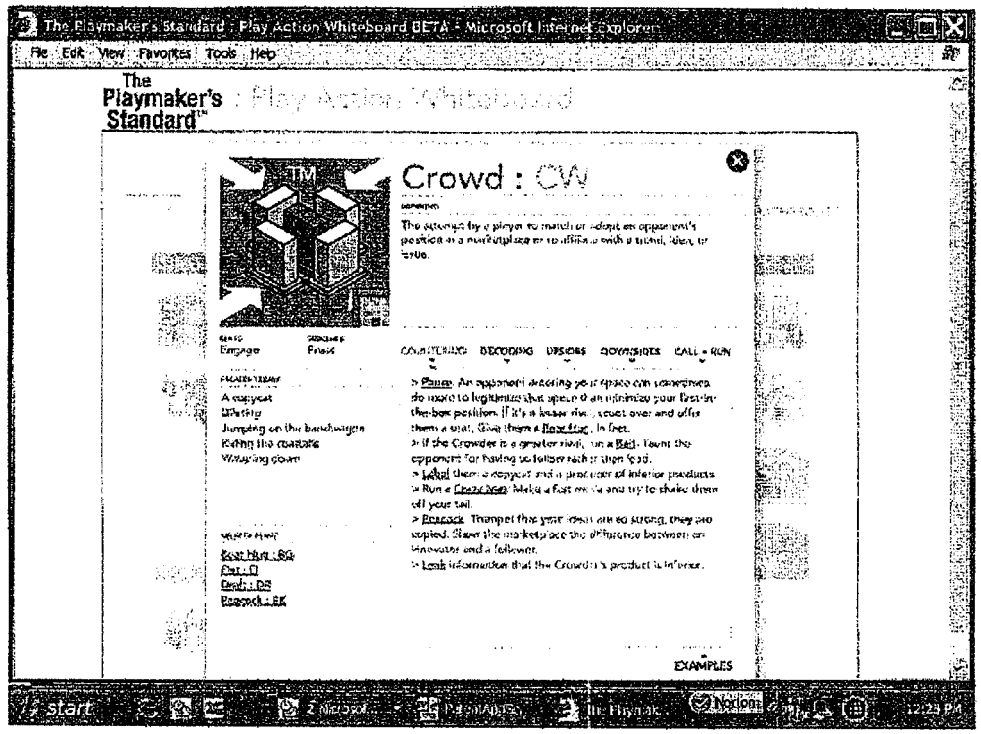
FIG. 29 Screen image of The Play Action Whiteboard showing the "flash card" of the Crowd play type.

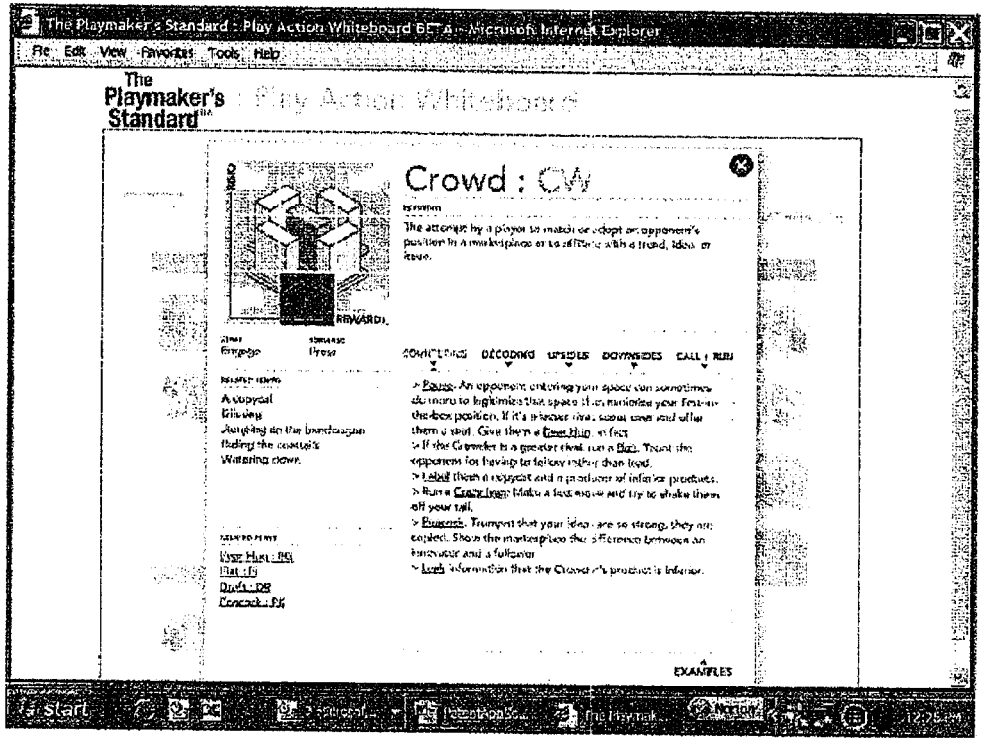
FIG. 30 Screen image of The Play Action Whiteboard showing the expandable risk/reward table (shown upper left), in this case of the play type "Crowd." Also shown are the clickable "countering" recommendations for a Crowd.

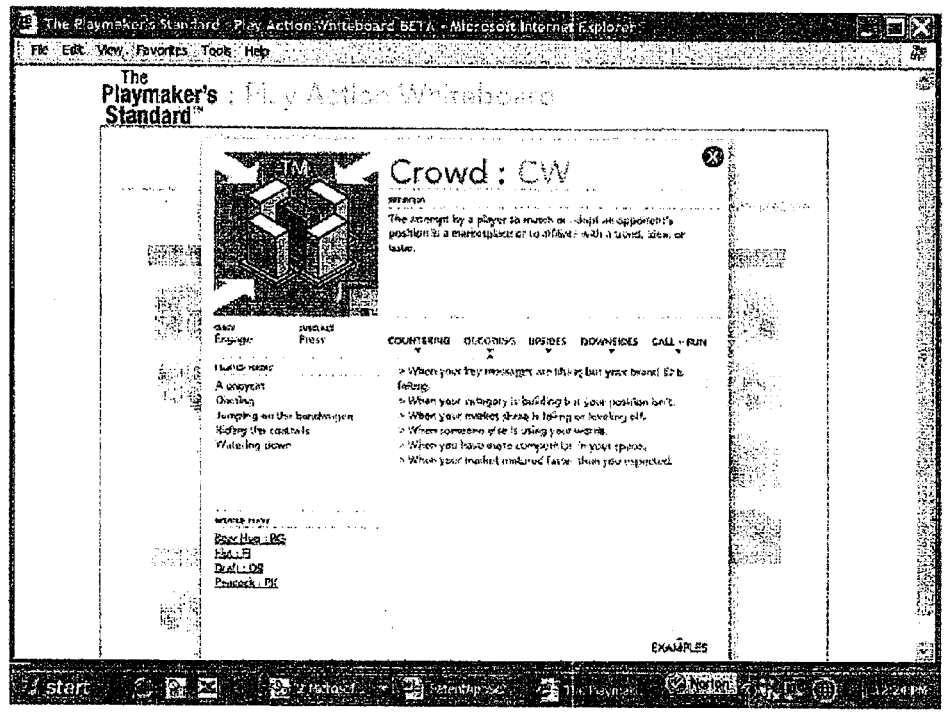
FIG. 31 Screen image of The Play Action Whiteboard showing the clickable "decoding" recommendations for the play type "Crowd".

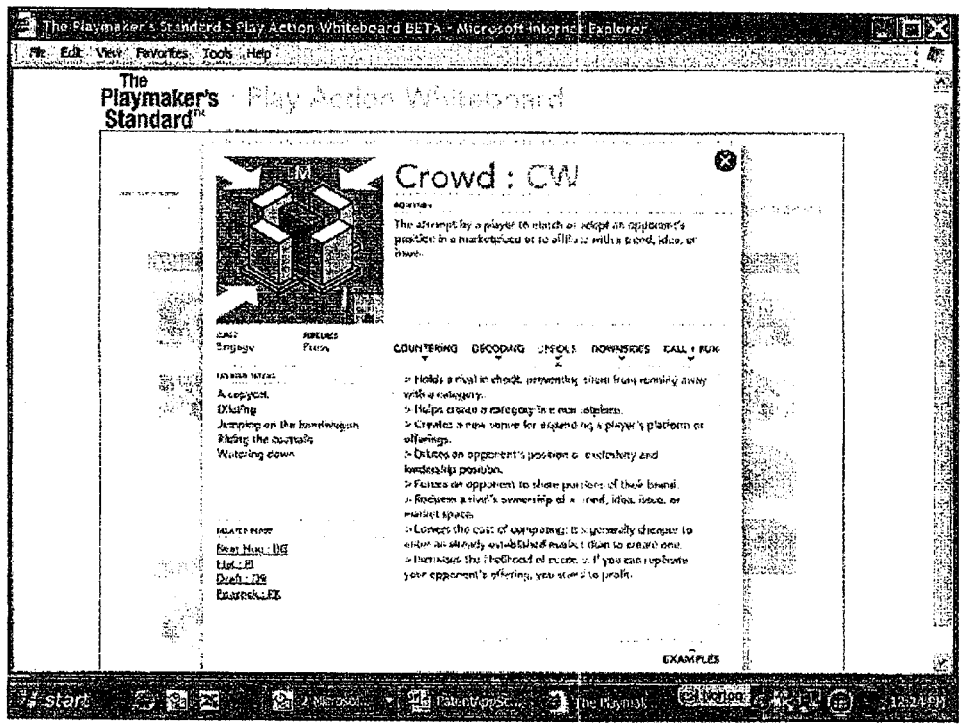
FIG. 32 Screen image of The Play Action Whiteboard showing the clickable "upsides" for the play type "Crowd."

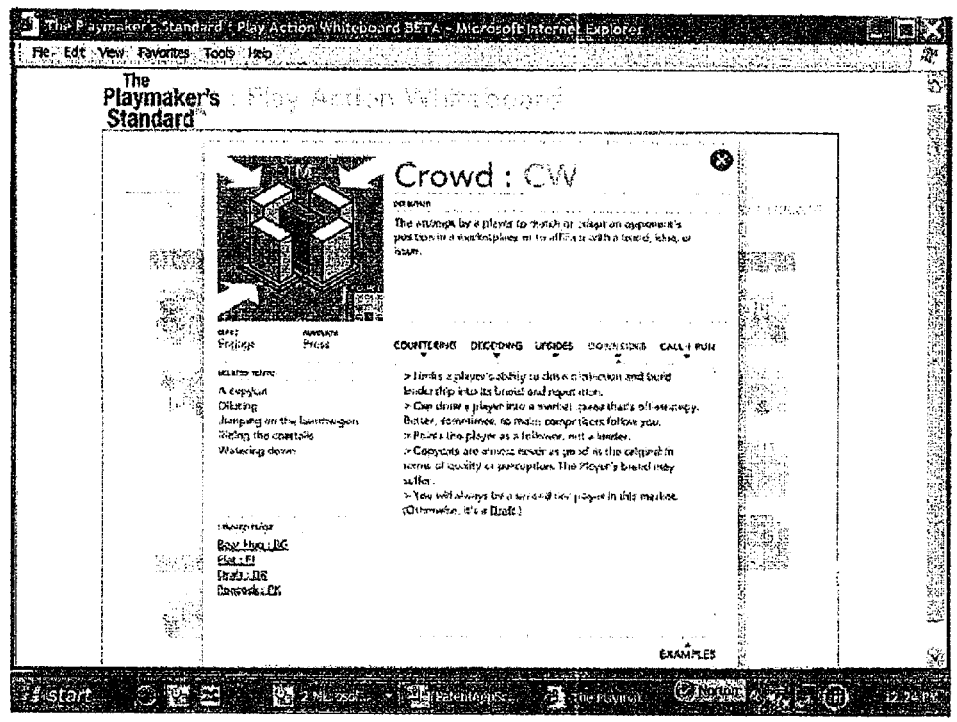
FIG. 33 Screen image of The Play Action Whiteboard showing the clickable "downsides" for the play type "Crowd."

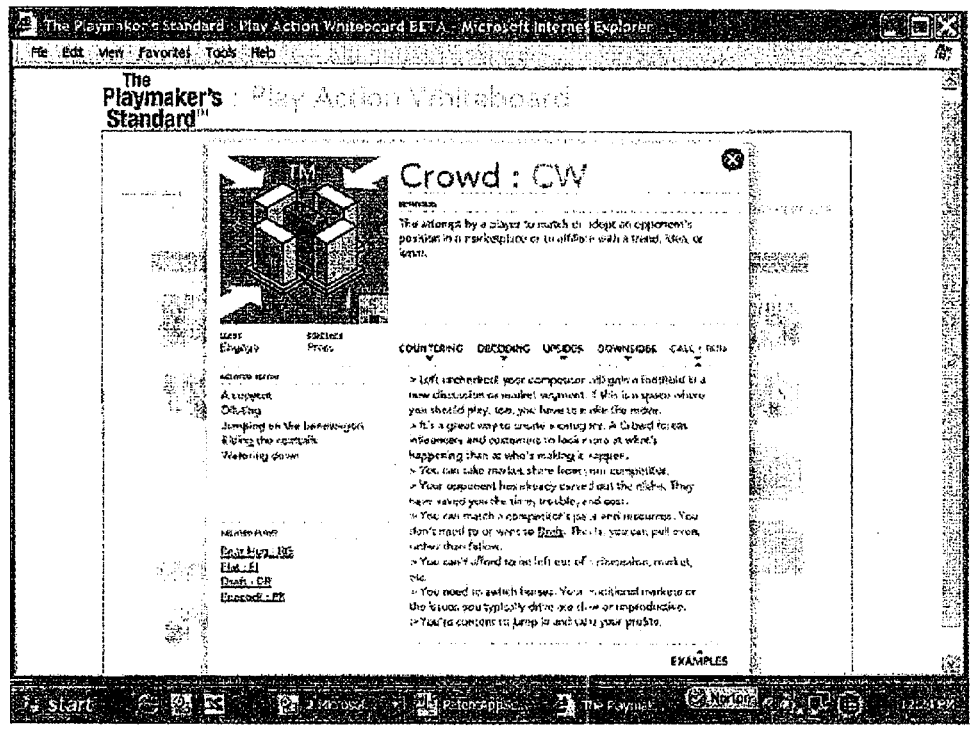
FIG. 34 Screen image of The Play Action Whiteboard showing the clickable best practices for "calling and running" the play type "Crowd"

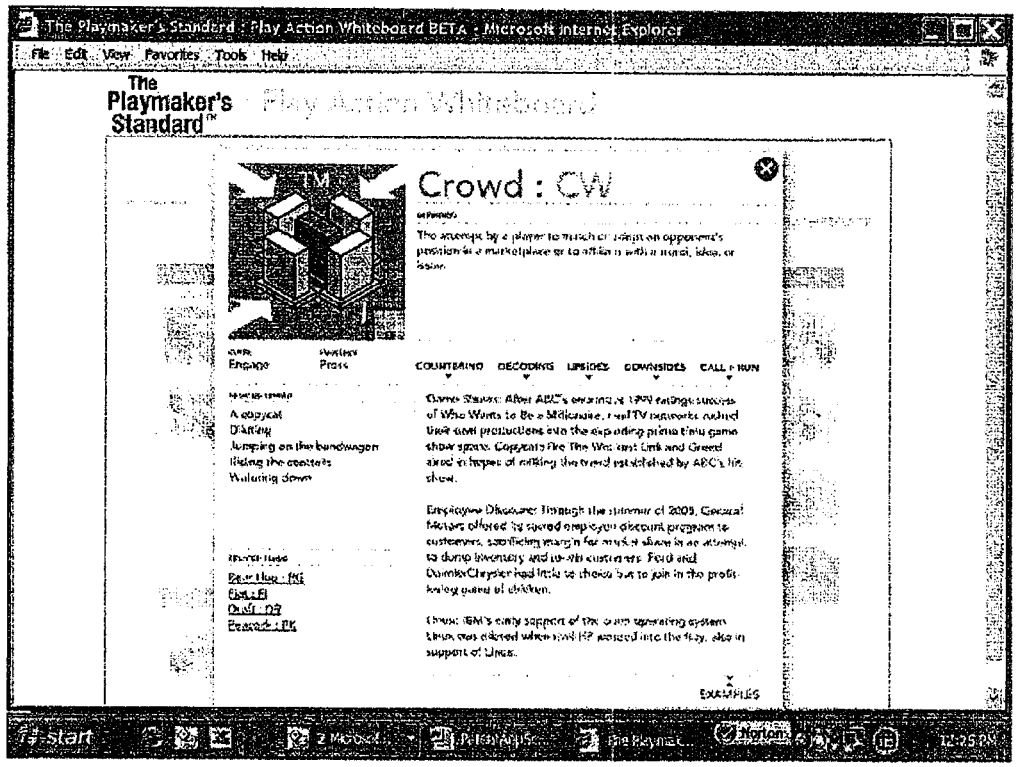
FIG. 35 Screen image of The Play Action Whiteboard showing three case examples for the play type "Crowd".

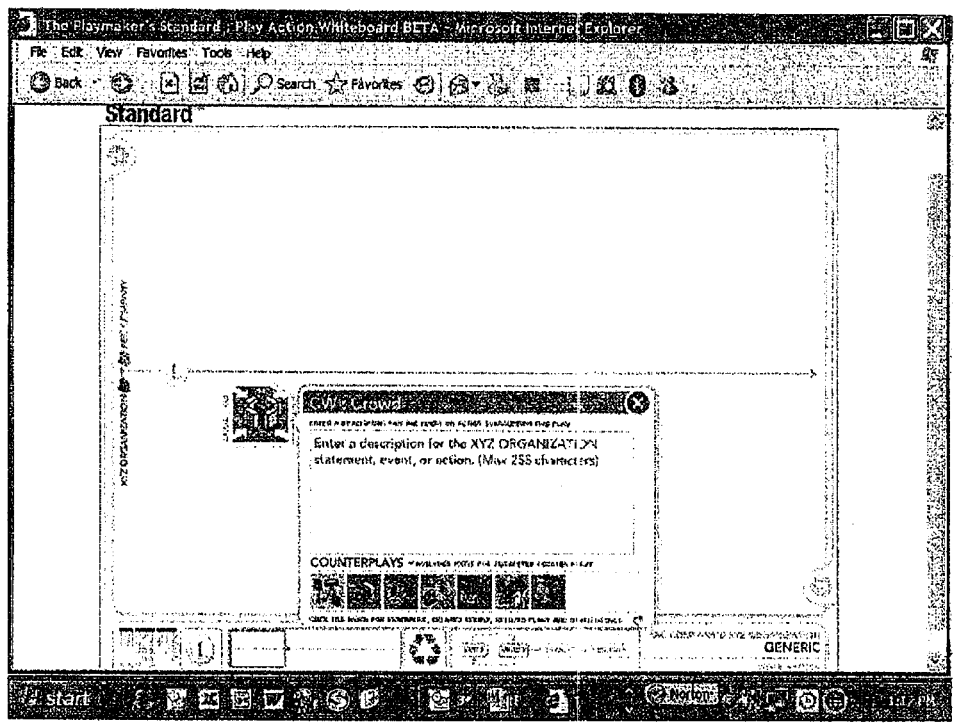

FIG. 36 Screen image showing the drag-and-drop placement of the play type "Crowd" onto The Play Action Whiteboard. This action prompts the user to describe the circumstances surrounding the selected play of XYZ (shown in the next graphic). Note that at any time the user may also discard the chosen play by dragging it into the green recycle box (shown on the tool bar above).

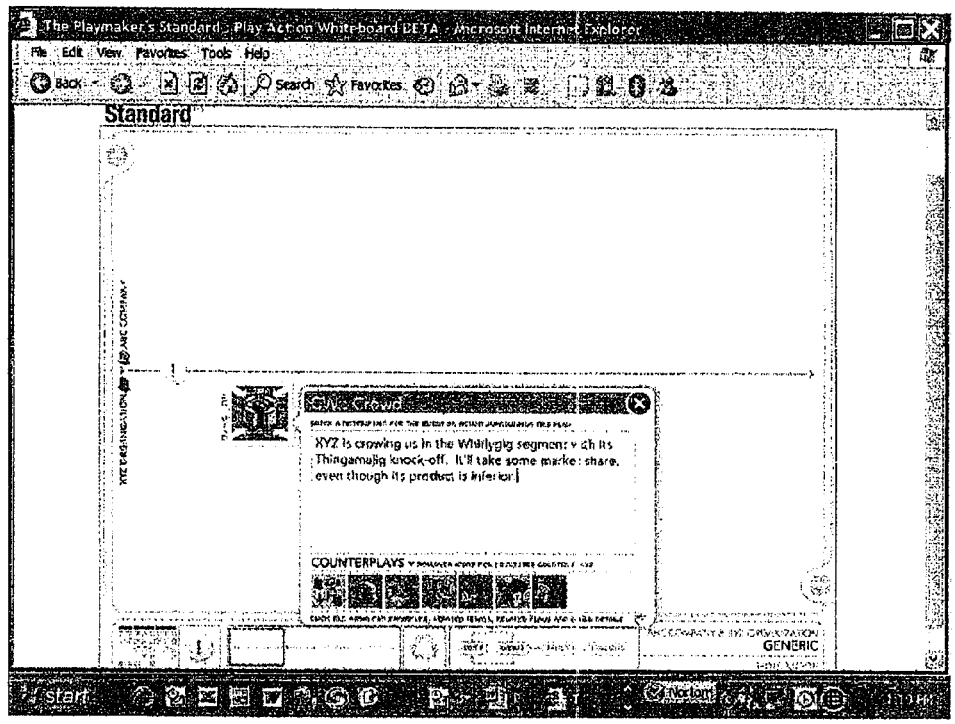
FIG. 37 Screen image from The Playmaker's Whiteboard showing that a user has responded to the prompts of a dialog box to describe the circumstances surrounding the selected play type, in this case a "Crowd".

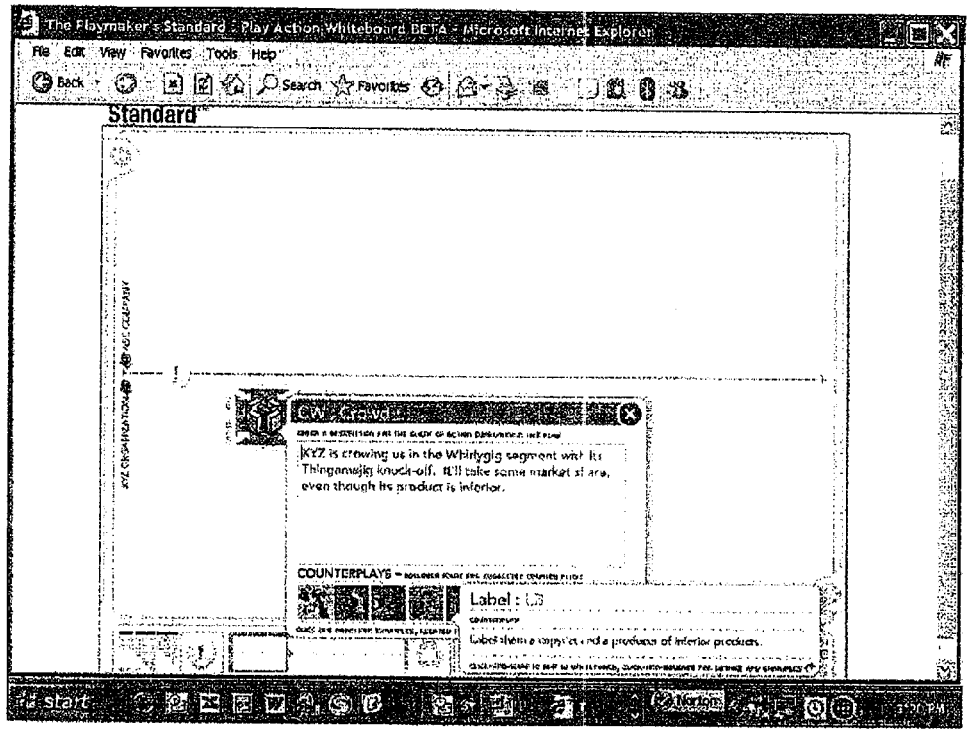

FIG. 38 Screen image from The Playmaker's Whiteboard showing the process by which a user may study recommended "counter plays" options for plays that have been run on the user or its organization. In this hypothetical case, the user of ABC has determined that its rival, XYZ, has run the play type "Crowd" and is considering the recommendation of the software to counter the play with a "Label."

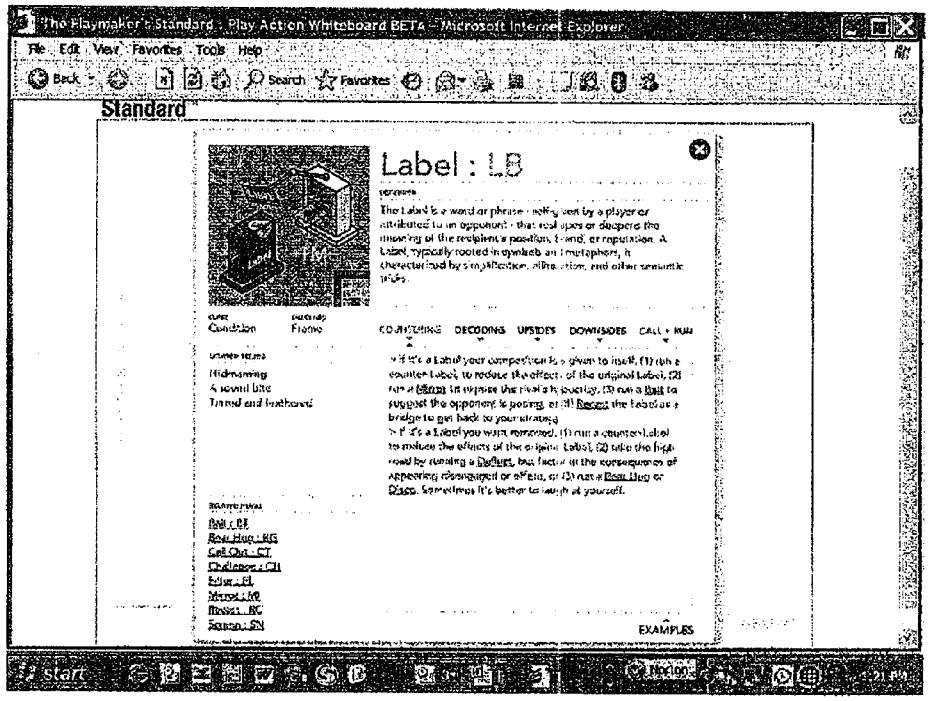
FIG. 39 Screen image from The Playmaker's Whiteboard showing that the ABC user has clicked on the play type "Label" as it contemplates the recommendation of the software to counter )('(Z's Crowd. Shown above is the "flash card' for the Label.

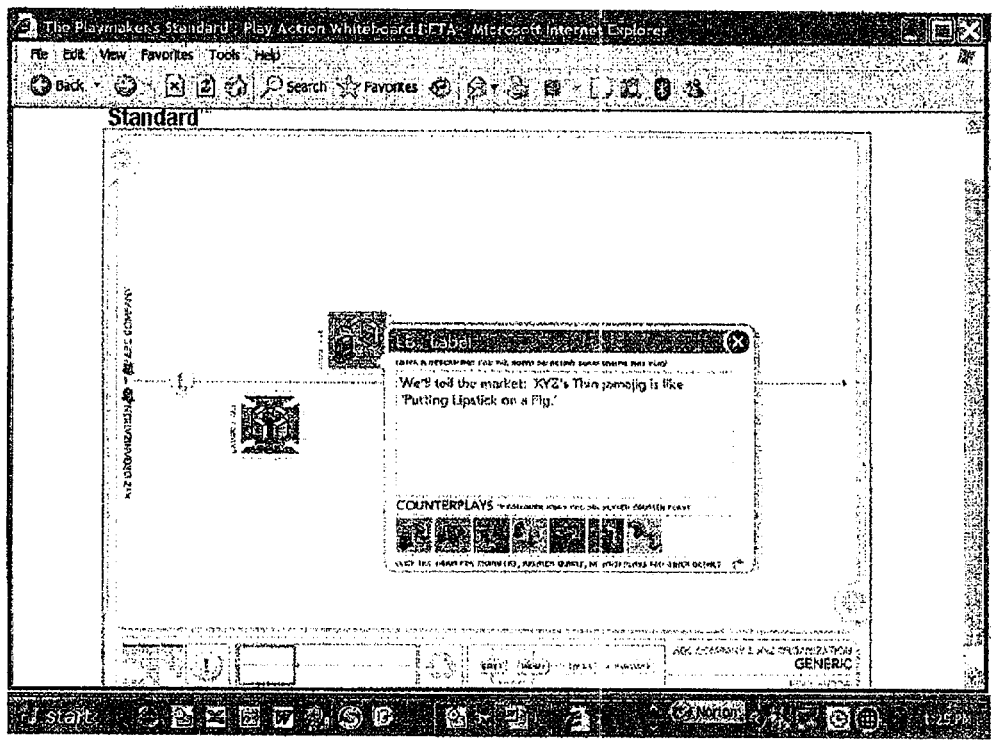

FIG. 40 Screen image from The Play Action Whiteboard shows that the *ABC* user has chosen and placed the play type "Label" as a countermeasure to XVZ's "Crowd." As many as eight individual moves may be viewed on a single screen and up to twenty-four total moves may be placed on a single play action map. The screen's position is indicated by the orange rectangle on the tool bar above.

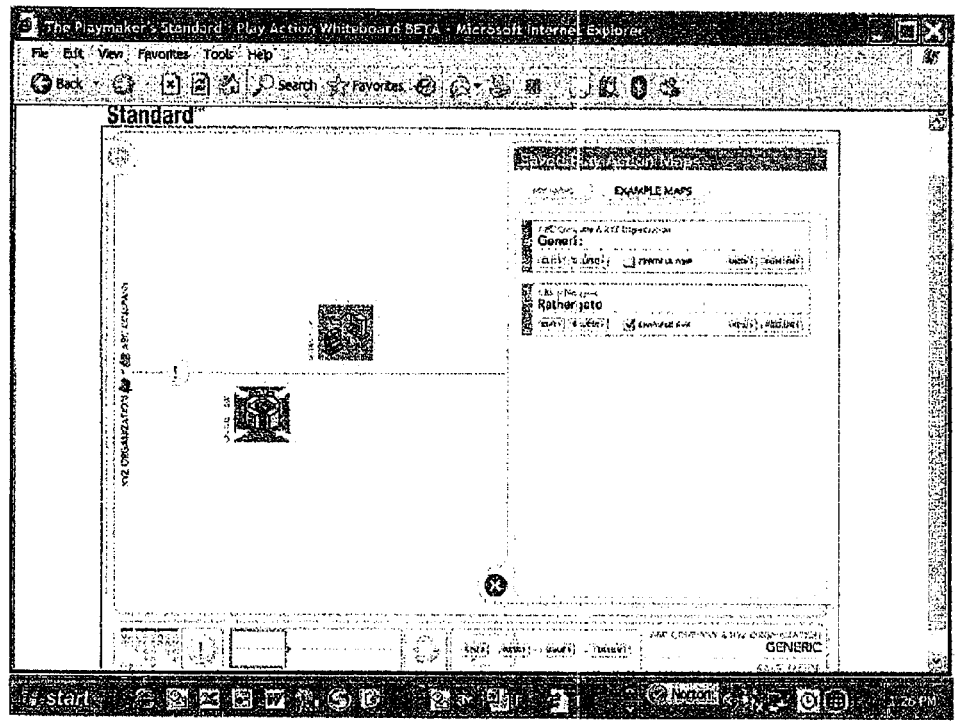

FIG. 41 Screen image of two play action maps. The first map (called *"Generic"*) has been created and now saved by a user. It may be accessed later, either to be viewed, edited, deleted and/or published as a password protectable PDF-formatted document. The second map (called "Rathergate") has been created and saved by the administrator as an "Example Map" for users of The Play Action Whiteboard. These be modified only by the administrator but may be freely viewed and published by users.

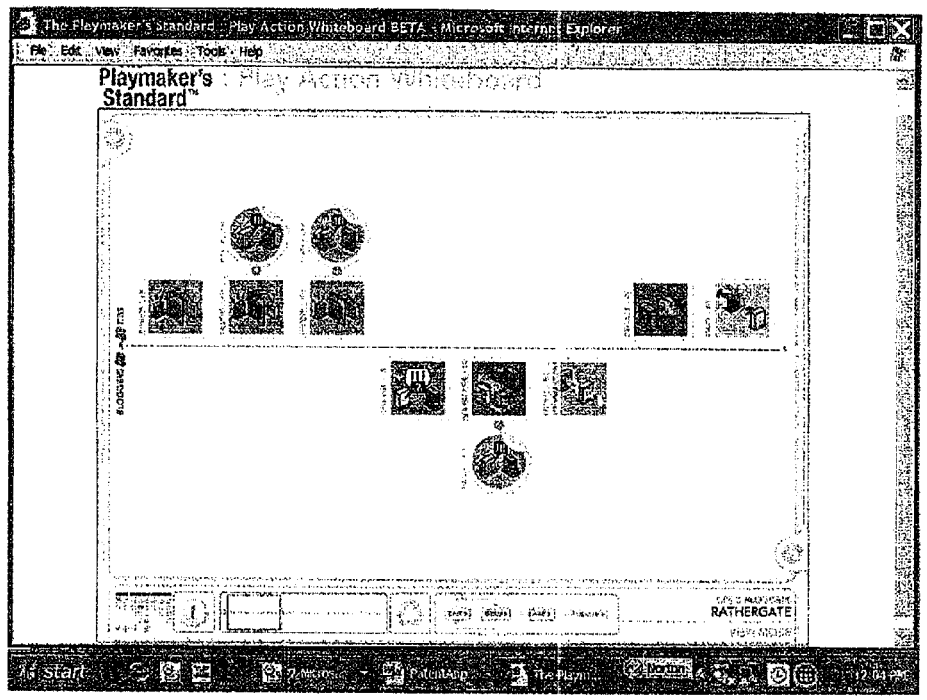
FIG. 42 Screen image of an "Example Map" placed by the administrator onto The Play Action Whiteboard. This map, an illustration of the 2004/2005 face-off between the CBS news network and conservative bloggers, illustrates play action through eight identified series of plays or combinations thereof.

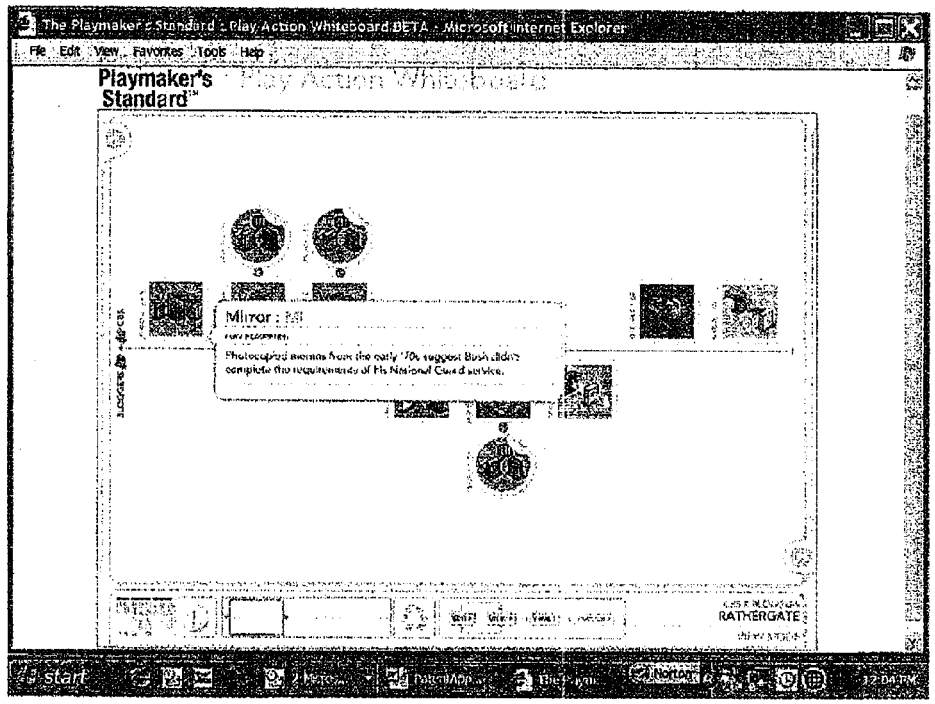
FIG. 43 Screen image of the "Rathergate" play action map, originally developed and saved on The Play Action Whiteboard. Shown above is the first of eight moves, this one a "Mirror" run by CBS.

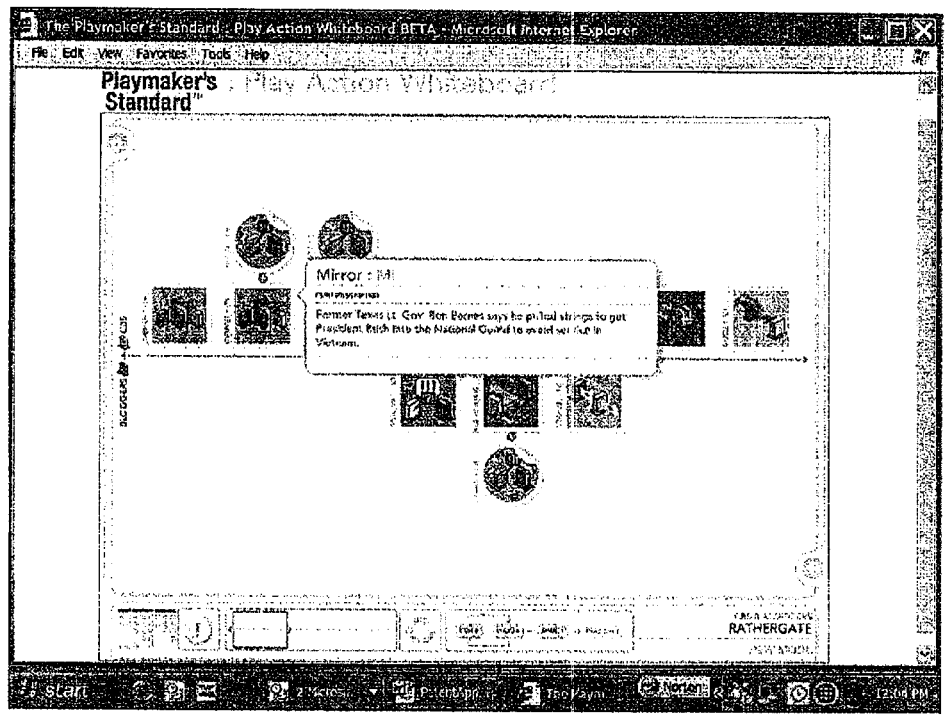
FIG. 44 Screen image of the "Rathergate" play action map, originally developed and saved on The Play Action Whiteboard. Shown above is the second of eight moves, this one a "Mirror + Proxy" combination run by CBS.

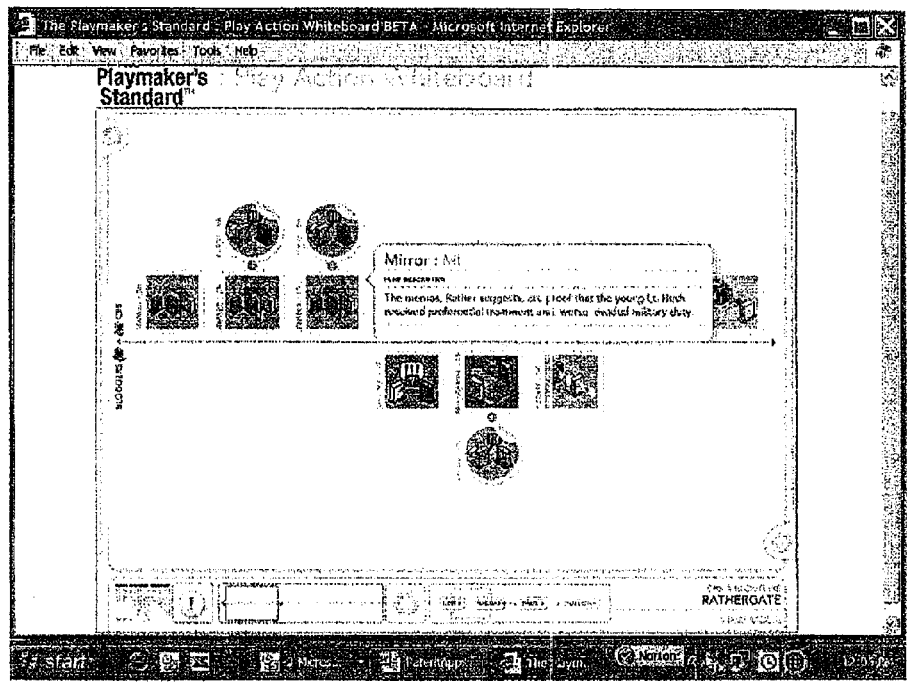
FIG. 45 Screen image of the "Rathergate" play action map, originally developed and saved on The Play Action Whiteboard. Shown above is the third of eight moves, this one a "Mirror + Proxy" combination run by CBS.

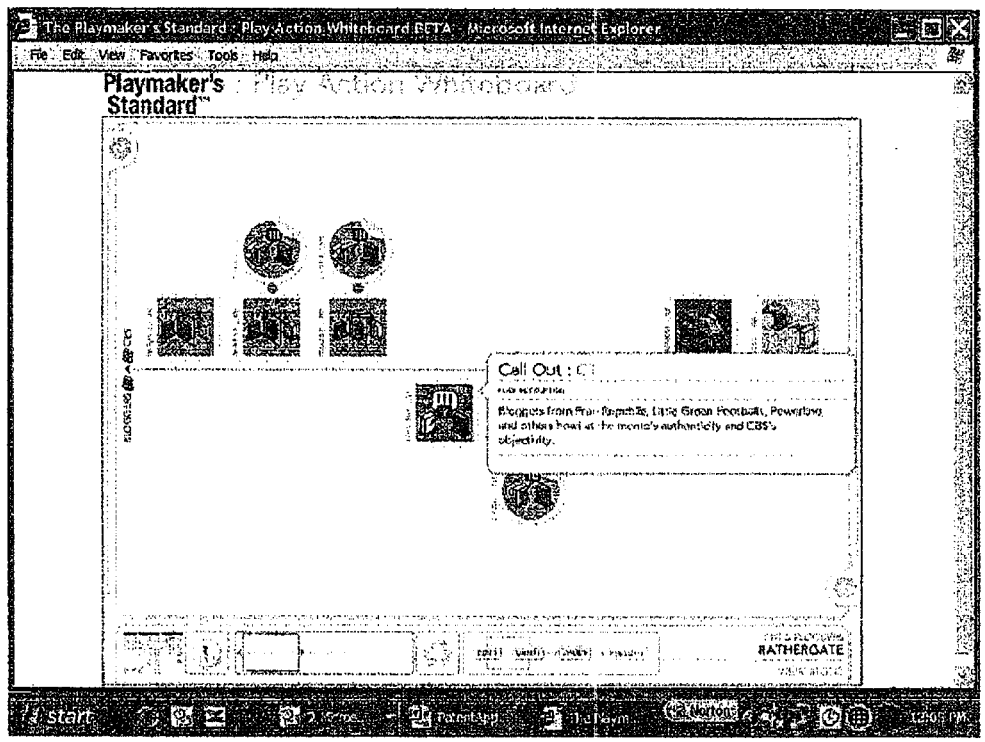
FIG. 46 Screen image of the "Rathergate" play action map, originally developed and saved on The Play Action Whiteboard. Shown above is the fourth of eight moves, this one a *"Call Out"* run by bloggers.

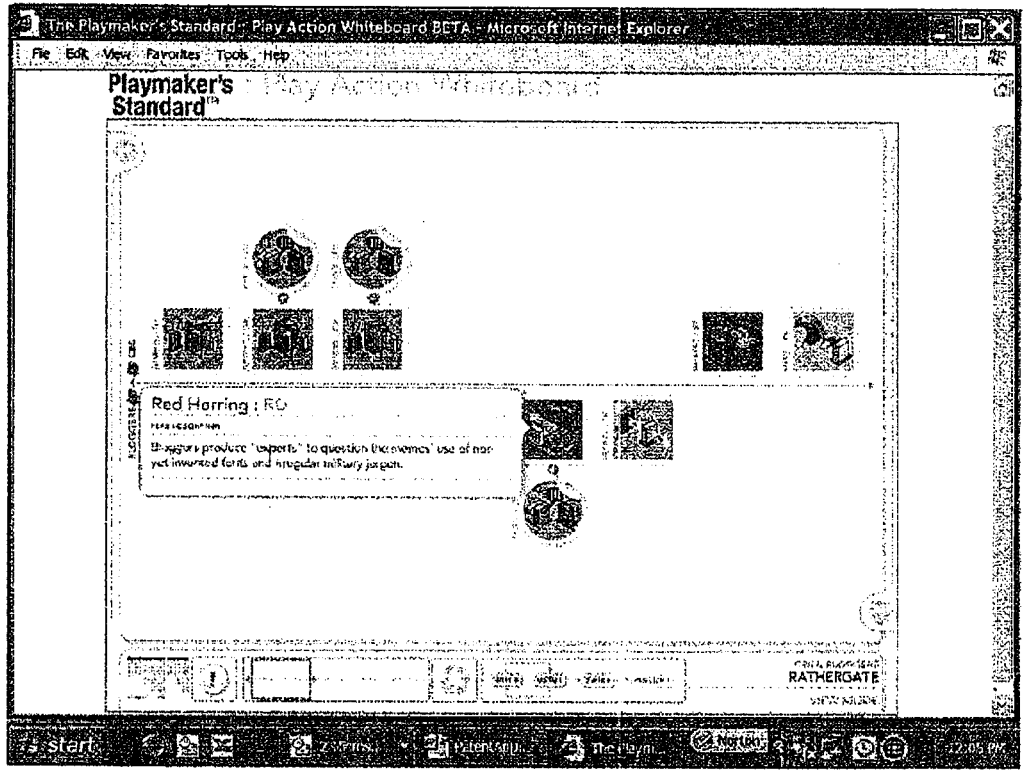
FIG. 47 Screen image of the" Rathergate" play action map, original)y developed and saved on The Play Action Whiteboard. Shown above is the fifth of eight moves, this one a "Red Herring + Proxy" combination run by bloggers.

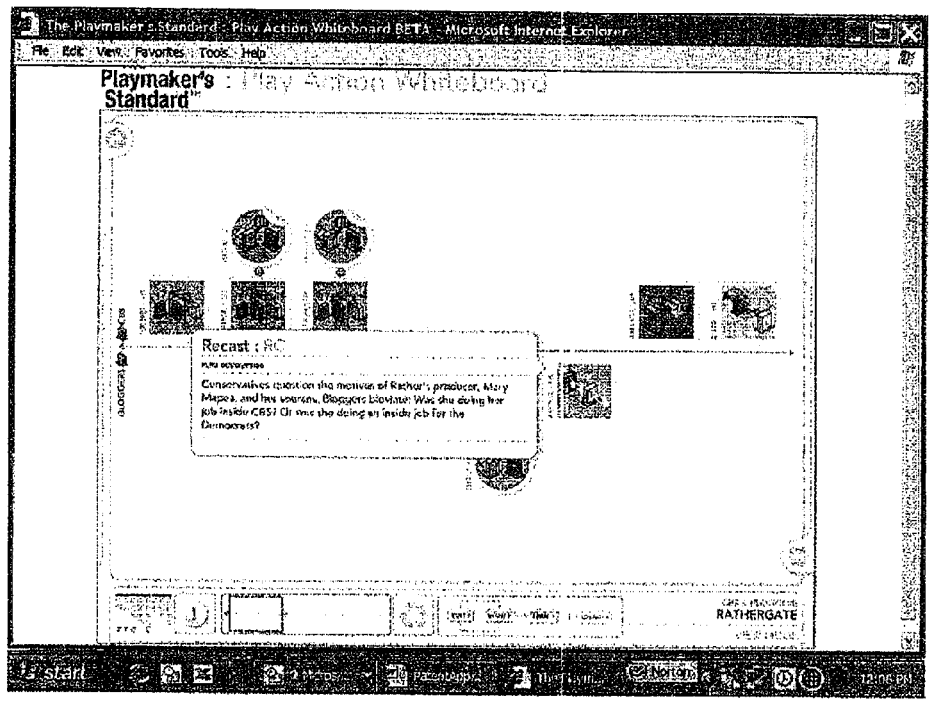
FIG. 48 Screen image of the "Rathergate" play action map, originally developed and saved on The Play Action Whiteboard. Shown above is the sixth of eight moves, this one a "Recast" run by bloggers.

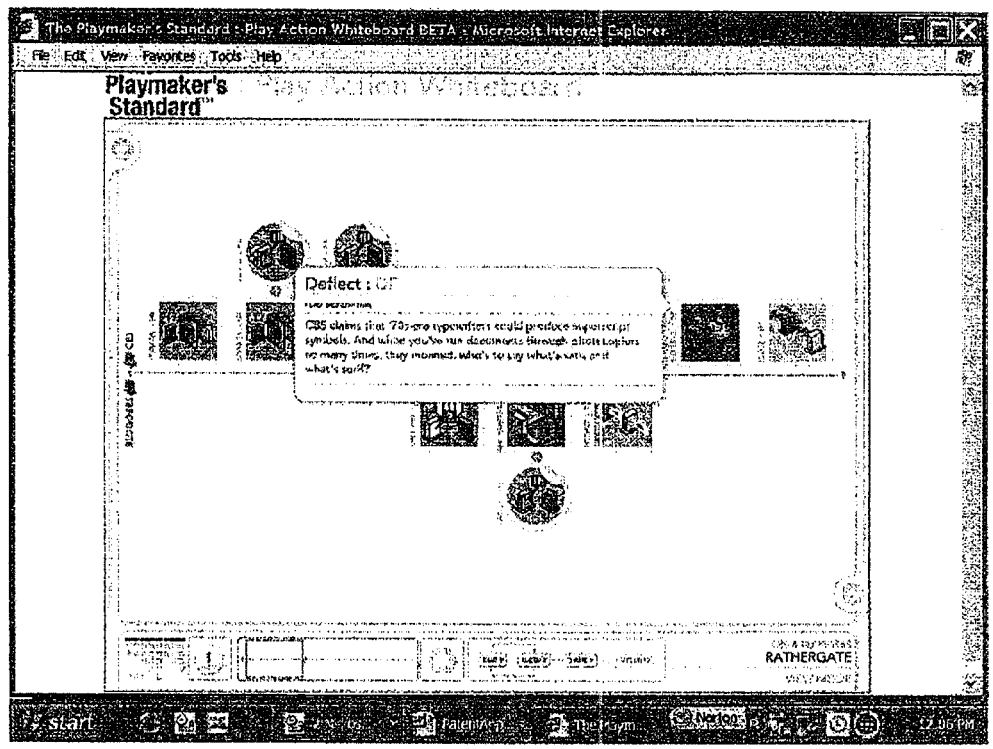
FIG. 49 Screen image of the "Rathergate" play action map, originally developed and saved on The Play Action Whiteboard. Shown above is the seventh of eight moves, this one a "Deflect" run by CBS.

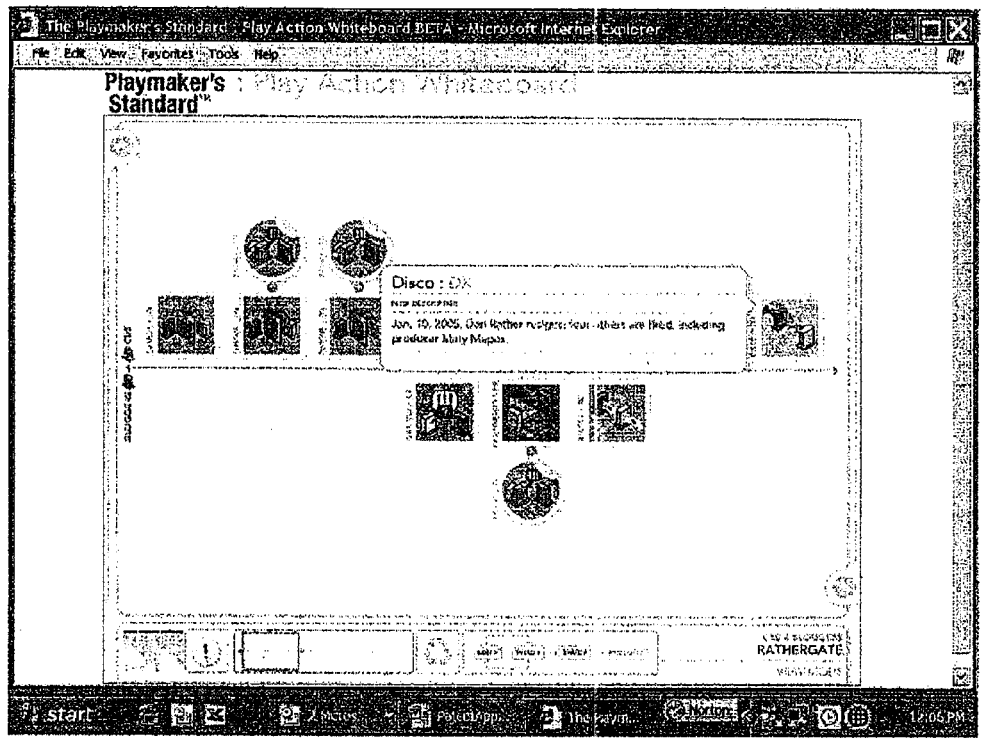
FIG. 50 Screen image of the *"Rathergate"* play action map, originally developed and saved on The Play Action Whiteboard. Shown above is the last of eight moves, this one a "Disco" run by CBS.

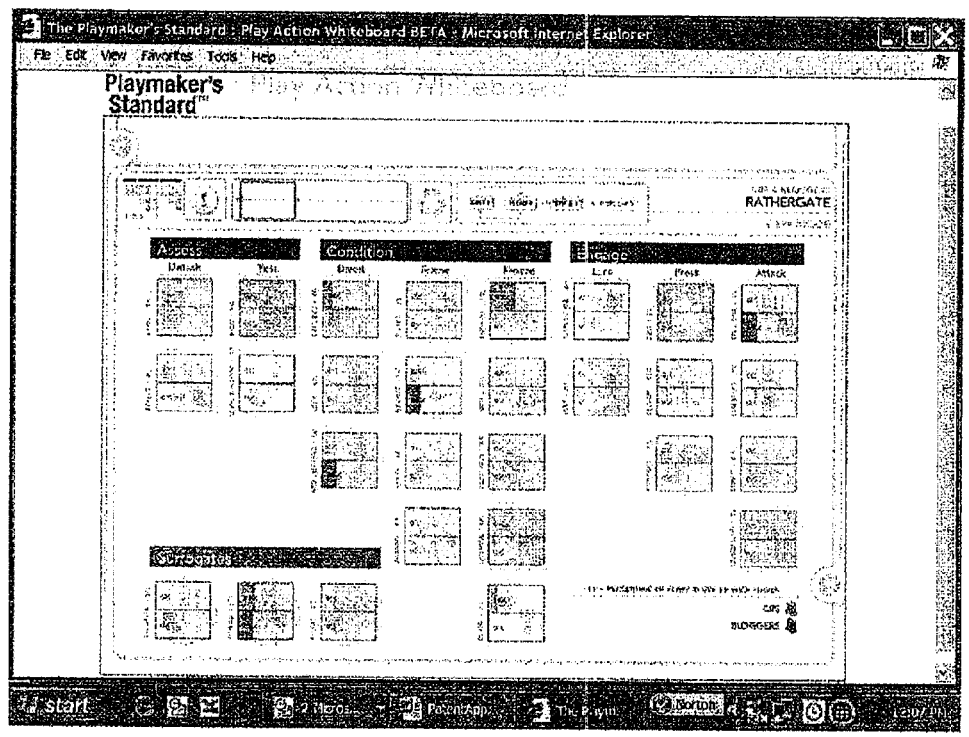
FIG. 51 Screen image from the Play Action Whiteboard which illustrates the frequency of use of plays and surrogates in "Rathergate" scandal 2004/2005. Frequencies are shown as a percentage of the total of the plays run plans by each respective player (see color –coded key in lower right hand corner above).

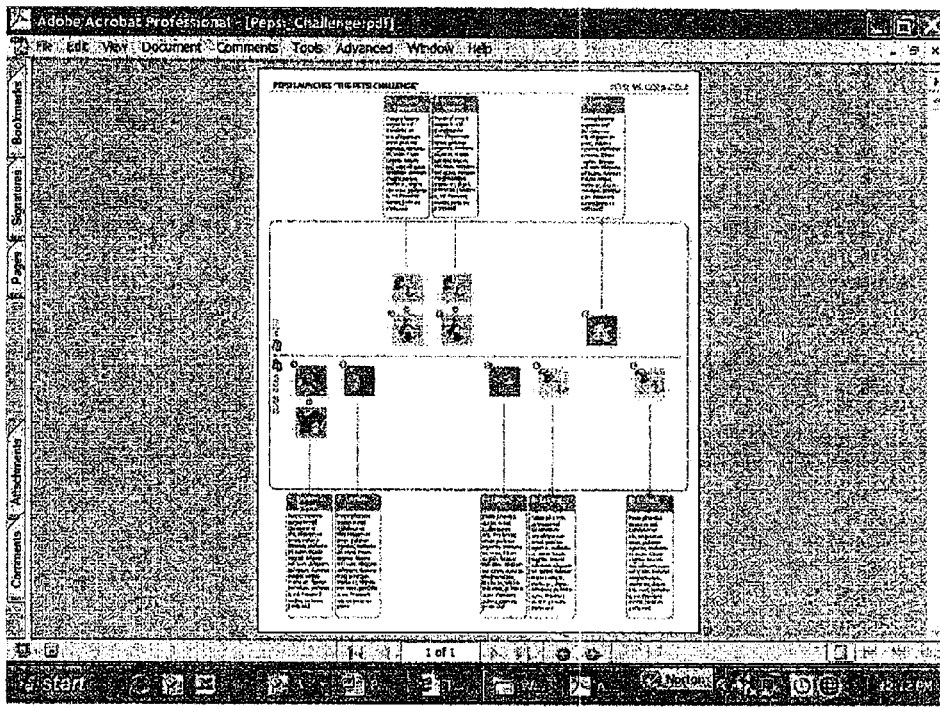

FIG. 52 Having completed or edited a play action map, a Play Action Map user may select "publish" to generate an annotated image of the selected plays and their descriptive captions. This screen image is of a generic play action map, published in a password protectable pdf-formatted document. Note that the eight plays or combinations thereof are linked by line and by number to their associated captions.

DECISION MAKING AND PLANNING SYSTEM, METHOD, AND SOFTWARE UTILIZING A TAXONOMIC TABLE OF IRREDUCIBLE STRATEGIES OR PLAYS

This application claims the benefit of provisional U.S. Patent Application Ser. No. 60/839,410, filed Aug. 23, 2006.

BACKGROUND OF THE INVENTION

1. Field of the Invention

This invention relates to a computer-implemented decision-making system and method that enables a decision maker to formulate strategies and tactics, by dividing completed or potential courses of action into irreducible units called "plays," and/or by utilizing three kinds of third-parties, referred-to herein as "surrogates." The plays and surrogates are presented as symbols or icons organized into a taxonomic table, with definitions and information useful in selecting the plays associated with and accessible through the symbols or icons.

In addition to the taxonomic table, the invention provides a methodology that helps decision makers sequence and pattern their moves or plays, and a resource that lists "factors" that influence plays and helps the decision maker fine tune the course of action.

In order to utilize the invention, a decision-maker selects plays and/or surrogates from the table and places symbols or icons representing the plays and/or surrogates on a template or whiteboard. Play selection is guided by the methodology, which in the preferred embodiment includes five steps, and by the listed factors. The result is a course of action, or map, including a sequence of plays (and/or surrogates) and corresponding information, that can be saved, edited, or published.

The system and method of the invention, including the table of plays and surrogates, the five-step methodology, and the list of factors, may be implemented as a website accessible by decision makers in a wide variety of fields including, by way of example and not limitation, management, strategy, marketing, sales, public affairs, advertising, public relations, media, and law. It is especially suitable for use in the context of business or commerce, but also is applicable to politics and any other field where decisions must be made, usually for the purpose of influencing a person or organization and collections thereof.

An in-depth description of the principles underlying the invention, as well as detailed descriptions of each of the plays and surrogates mentioned herein, is found in *Elements of Influence* by the Inventor, Alan Kelly, published in October, 2006 by Dutton Books, a division of Penguin Publishing USA, and incorporated herein by reference.

2. Description of Related Art

The concept of a general decision making tool that reduces the process of decision-making and planning of strategy to a system that can be implemented on a website is believed to be unique. While "expert systems" designed to solve problems in specific fields are well-known, and while all such problem-solving ultimately involves common underlying principles, the Inventor is the first person to reduce those principles to a form, and in particular a finite set of irreducible "plays," that can be used by decision makers and planners in any field, for virtually any decision that needs to be made or plan to be developed.

A play, as defined by the Inventor, is a strategem, i.e., one of a finite set of discrete strategic maneuvers a person or organization employs to improve its relative competitive position in a "marketplace." The term "marketplace" as used herein refers to a broad playing field that encompasses all types of business or activities that might involve competition, from the public to the private sector, from governments to institutions to venture start-ups and individuals, and from not-for-profits to profiteers.

Basically, the invention involves a comprehensive set of moves and counter-moves that people and organizations might employ in business, politics and popular culture, defining the "plays" that a decision maker runs on allies and rivals alike, and exposing the plays that allies and rivals in turn run on the decision maker. Individuals and organizations have always run plays, and particular plays have always been subject to in depth analysis. However, it has not heretofore been possible to categorize and present the plays in a way that is generally applicable and yet presentable on a web-site.

Examples of conventional expert systems are found in U.S. Pat. Nos. 6,850,923; 6,847,957; and 5,481,647. Such systems can be very useful in particular applications. However, they do not provide the versatility of the present invention, which is not limited to a particular application but has much wider applicability. The reason is that while conventional expert systems involve knowledge databases and rules for accessing the databases, so that a previously stored answer can be associated with a question or problem, the present invention seeks to provide guidelines and templates to guide the decision-making process, rather than particular rules or answers to specific problems. In other words, whereas expert systems provide predetermined answers to specific questions, the present invention provides general rules that can be adapted to completely novel situations or contexts. If a conventional expert system is analogous to a human consultant hired to solve a particular problem based on his or her previous experience, the system and method of the invention is analogous to hiring Socrates, who might not know anything about the particular situation or context but will ask the right questions, based on a knowledge of decision making in general rather than on specific experience, to enable the decision maker to arrive at the best possible solution.

SUMMARY OF THE INVENTION

The system and method of the invention is based on the principle that any strategy or course of action that a person or organization might undertake when presented with a particular challenge, or to achieve a particular goal, can be broken down into a series of "plays" or irreducible strategems that may be carried out by, or on behalf of, an individual or organization. The Inventor has identified 25 such plays, although the number and definitions of the plays is not intended to be limiting since there may be plays that have yet to be identified, and disagreements may exist as to the proper identification or categorization of existing plays. The invention does not depend exclusively on particular plays, but on the concept of presenting the plays in a form that gives a decision maker insight into the decision that needs to be made, and that can be practically implemented.

In the illustrated embodiment, the plays are presented in the form of a unique taxonomic table of symbols or icons, divided at the very least into a number of groups, categories, or classes arranged according to degree of confrontation and/or ease of execution, each group, category, or class containing one or more plays, that can be displayed in a way that facilitates selection by a user, and that enables definitions and information on the plays to be easily accessed as well as recommended upsides, downsides, best uses, and guidelines for decoding and counteracting plays.

The taxonomic table may take the form of a chart or display of 25 play types arranged in three classes and eight subclasses that works on two dimensions to indicate degree of confrontation and ease of implementation, and explains the relationships of plays to one another and how they progress. Descriptions of each of the 25 play types and three surrogates is provided below, with further information and examples being contained in the above-cited The Elements of Influence by the present Inventor.

Although the invention involves both "plays" and "surrogates," as noted above, for purposes of conciseness the following discussion refers primarily to "plays." However, it is to be understood that "surrogates" may be selected and/or applied in the same manner as plays, and that any discussion of "plays" will in general implicitly apply to "surrogates" as well.

In addition to the table, the invention also preferably includes a five step methodology that helps decision makers sequence and pattern their moves for success. The methodology may include (I) a "fit or friction" step in which a source or sources of agreement or disagreement are identified, (ii) a play selection step, in which one or more plays is selected from the table, (iii) a step of actually executing or running the play or plays, (iv) a step in which the decision maker pauses to assess the result of running the play or plays, and (v) continuing or discontinuing the plays according to the results of the assessment. Of course, only steps (I) and (ii) actually involve a computer-implementation, the remaining steps being carried-out by the decision maker in real life, i.e., in the marketplace, on the campaign trail, on the battlefield, and so forth, although the computer-implementation can provide continued guidance as the various steps of the methodology run their course. In the context of a business, for example, the process guides the decision maker as they parley and propel their agenda, from the glimmer of a brainstorm to the glitter of a marketplace phenomenon, from a competitor's attack to a competitor's defeat.

Finally, in addition to the taxonomic table of plays and the five step methodology for applying the plays, another feature of the invention is to provide a resource that lists the important variables or "factors" that influence a marketplace and help fine-tune diagnoses and battle plans. This feature of the invention is optional but useful, and is included in the preferred embodiment described below.

The preferred implementation of the invention is in the form of a website, although the invention may of course also be made available over a wireless network or any other media capable of presenting information to the user in the manner that enables the principles of the invention to be utilized by a decision maker. In the case of a website, once the user logs into the site, the user is prompted to use the site, at least the taxonomic table of plays, and a template or "whiteboard" onto which selected plays may be placed and associated with information concerning application of the plays, the actors who will be carrying out the plays, and such information as the times and locations at which the plays will be carried out. The filled-in "whiteboard" may then be stored for editing, distribution, or publication.

In a preferred embodiment of the invention, the whiteboard enables plays to be plotted along a timeline to illuminate the patterns, sequences, trends and tendencies of marketplace play action, including moves that have been made and potential moves. Input of supporting information is carried out by selecting an icon or "information bubbles" into which information may be input in a captioned form.

The user, in the preferred embodiment, may call up further details of the play's capabilities and characteristics by clicking on or otherwise selecting a particular play or surrogate, and calling up a "flash card" that presents a menu or menus through which different details may be accessed. The further details may include, but are not limited to, one or more of the play's rated risks and rewards, definition, lists of related plays and terms, case examples, and suggested upsides, downsides, best uses and recommended means for decoding and countering the play. One especially useful type of information that may be associated with a play or plays is examples of the plays.

In the illustrated example, the taxonomic table includes three classes of plays: referred to as "assess," "condition," and "engage" plays, as well as a "surrogate" grouping of three additional entities. The "assess" class includes plays involving monitoring and profiling of players and marketplaces, the "condition" class includes plays involving encouragement or suppression of strategies to influence or reform sentiments of players and marketplaces, and the "engage" class includes plays involving plays that destabilize players and marketplaces, assert leadership, or invite competitive responses. Finally, the separate "surrogate" group includes actions that involve enlisting support from third parties.

In the illustrated non-limiting example, each class is divided into subclasses, and each subclass includes individual plays, which are described in detail below. Of course, the particular taxonomy of the illustrated example, while believed to be especially advantageous, is not intended to be limiting, and it is possible that different taxonomies could be developed without departing from the principles of the invention.

BRIEF DESCRIPTION OF THE DRAWINGS

FIG. 1 and 3-52, referred to hereinafter as Graphics 1 and 3-52, are screen shots illustrating a preferred web-based implementation of the principles of the invention.

FIG. 2, referred to hereinafter as Graphic 2, is a schematic illustration of the manner in which the taxonomic table of the invention is organized.

DETAILED DESCRIPTION OF THE PREFERRED EMBODIMENTS

Graphics 1 and 2-52 are screen shots illustrated the method and system of a preferred embodiment of the invention. The invention involves both a system, implemented by a website, and a method of decision making and planning using the system, as well as software that controls the illustrated displays, and a taxonomic table utilized by the system and method of the invention.

In its broadest form, the invention depends on the concept of "plays," and involves the presentation of a series of "plays" to a decision maker or planner, and a means and methodology for selecting and utilizing the plays. The plays are presented in the form of a taxonomic table, an example of which is illustrated in Graphics 1-15.

According to a preferred implementation of the invention, each play is represented by a symbol or icon, and the table is displayed in the form of chart containing the icons arranged in classes and subclasses. In particular, the plays are categorized by classes, each class including a particular subclass or type of play, and each subclass or type of play being represented by one or more plays. As explained in more detail below, associated with each play is a play definition that appears, in the screen shots of Graphics 1-15, as a test window or box when a cursor, pointer, or other selector is placed over the icon or symbol, or when the icon or symbol is otherwise selected.

Graphic 1 is a screen image of the overall table. As is apparent, the table is divided into play classes labeled "assess," "condition," and "engage," with an attendant "surrogate" grouping. These classes are arranged in two axes, as illustrated in Graphic 2. The horizontal axis generally represents the degree of confrontation, ranging from minimal or indirect to maximal and overt, and the vertical axis generally represents the ease of execution, with the easiest and least risky at the top. Of course, it will be appreciated that the degree of confrontation and ease of execution levels are approximate and general only, and that any play can have different levels of difficulty or result in higher degrees of confrontation depending on the player, the opponent, and the context, among other factors.

The "assess" class of plays, also shown in Graphic 3, includes plays involving monitoring and profiling of players and marketplaces. The "condition" class of plays, also shown in Graphic 4 including plays involving encouragement or suppression of strategies to influence or reform sentiments of players and marketplaces. The "engage" class of plays, also shown in Graphic 5, includes plays involving plays that destabilize players and marketplaces, assert leadership, or invite competitive responses. The "surrogate" grouping, shown in FIG. 14, includes enlisting support from third parties.

The assess class of plays is further categorized by subclasses or play-types including the "detach" subclass of plays, illustrated in Graphic 6, in which a player exits a marketplace, and the "test" subclass of plays, illustrated in Graphic 7, in which the player sizes up issues, events, developments, and ideas, and forecasts a player's wishes or needs.

The detach play subclass, illustrated in Graphic 6, includes a "pass" play involving strategic withdrawal from a marketplace or play action, and a "pause" play involving suspension of activity to assess the marketplace or let conditions develop/ripen.

The test play subclass, illustrated in Graphic 7, includes a "ping" play, in which the player sends an oblique reference or suggestion to the marketplace, either by mere presence or an implied interest in topics, ideas, event, and developments, in order to evaluate a resulting reaction without direct engagement, and a "trial balloon" play, which involves preview and testing of preliminary ideas or tentative plans, often without attribution or on a temporary basis.

The "condition" class, illustrated in Graphic 8, includes a divert subclass of plays, in which a player is distracted or rerouted from its intended course of action, a frame subclass of plays, illustrated in Graphic 9, which adjusts the criteria and context of actions in the marketplace, and a freeze subclass of plays, illustrated in Graphic 10, in which the movement of a competitor is inhibited, its motives are confused, or further erosion of a player's position or agenda is prevented.

The divert subclass of plays, illustrated in Graphic 8, includes a deflect play in which a player seeks to divert a rival's attack to avoid or minimize impact, a leak play, in which a player selectively discloses normally privileged or confidential information to a specified target in order to divert or accentuate a developing idea in the marketplace, and a red herring play in which an action is taken to draw an opponent away from its preferred position or intended course of action.

The frame subclass of plays, illustrated in Graphic 9, includes a "filter" play, in which information is selectively re-transmitted to build or defend a position, a "recast" play, in which an action, event, information, message, or symbol is reinterpreted so as to lend support for a player's position or agenda, or neutralize or weaken a position or agenda of a rival, a "label" play, in which a word or phrase is self-given by a player or attributed to an opponent to reshape or deepen the meaning of the recipient's position, brand, or reputation, and a "screen" play, in which a player borrows issues, ideas, events or other symbolic references to advance the player's agenda or thwart competitive movements.

The freeze subclass of plays, illustrated in Graphic 10, includes a "mirror" play in which new facts or information is introduced into a marketplace to contradict a rival's position or point of view, a "jam" play, in which the player attempts to disable or disorganize a rival's activities or communications and/or receipt of information, a "bear hug" play, which involves a conspicuously public embrace of an opponent's position or message, a "lantern" play, which involves a preemptive disclosure by a player of its own flaw, mistake, or other source of potential embarrassment or controversy, and a "disco" play, in which a player sacrifices an element of its platform in order to preserve or advance its overall agenda or argument (i.e., one step back, two steps forwards).

The engage class of plays includes a lure subclass of plays, illustrated in Graphic 11, in which an opponent is dared to take an action, a press subclass of plays, illustrated in Graphic 12, in which a player employs authority, ability or audacity to establish a position, and an attack subclass of plays, illustrated in Graphic 13, in which a player commits to compete directly for a desired position.

The lure subclass of plays, illustrated in Graphic 11, includes a "challenge" play, which is a public appeal, suggestion or demand by a player, designed to mobilize and/or inspire a person, organization or broader constituency to consent or take action to benefit the player, and a "bait" play, which is an overt provocation of an opponent through action or information, intended to draw an emotional rather than rational response.

The press subclass of plays, illustrated in FIG. 12, includes a "fiat" play, which is a declaration of information or demonstration of capability to a marketplace in order to shift a competitive dynamic, a "crowd" play, which is an attempt by a player to match or adopt an opponent's position in a marketplace, and a "peacock" play, which is an attempt by a player to bring attention to itself by an unusual action, innovation, or precedent-setting development.

Finally, the attack subclass of plays, illustrated in FIG. 13, includes a "call out" play, which is an overt public expression of doubt or concern intended to call into question a flaw in the opponent's position or message set, a "preempt" play, which is an action that reverses competitive position in a way that surprises and disables the competition, a "draft" play, which is an attempt by a player to feed off the energy of a developing marketplace, innovation or best practice with the intention of overtaking leaders, and a "crazy ivan" play, which alters the course or circumstances of an impending attack by inviting or initiating the attack.

The "surrogate" grouping, illustrated in Graphic 14, includes the activities of an enlisted third party, including a "partner" surrogate (also illustrated in Graphic 15), in which the player aligns with a third party who operates as a co-equal in pursuit of a common agenda or business purpose, a "proxy" surrogate, in which an associate advocates for an supports the agenda of a player, but conveys a sense of free-will and independence, and a "plant" surrogate, in which a trusted and confidential ally, usually disguised or undisclosed to the opponent, seeds or senses information in the marketplace.

The taxonomic table illustrated in Graphics 1-15 may be thought of as part of a "system" that includes three parts:
1. The "table" itself;
2. A five step methodology that helps decision makers sequence and pattern the plays included in the table; and 3. A resource that lists important variables that influence a marketplace and help fine-tune diagnoses and battle plans developed according to the five step methodology and utilizing the taxonomic table of plays.

Each of these parts is implemented, at least in part, by a website that includes the screens illustrated in Graphics 1-15, as well as Graphics 16-52 to be described below. The relationship between the three parts of the system of the invention, and a method of decision making that utilizes the system, will best be understood by the following description of the manner in which the various screen are arranged to be presented to a user and utilized by the user to make decisions. Software is used to present the taxonomic table and associated information, and to enable information input in the manner described below to facilitate decision making in a unique way. Details of the software, and in particular specific programming code for generating the illustrated displays or screens, are not described herein since they are well within the capability of a skilled programmer once the principles described below and understood.

Initially, the user must log into the system, for example by using a login screen such as the one illustrated in Graphic 17. Such a login screen is standard and the details of the screen are not part of the present invention, i.e., any login or registration screen may be used, or the screen may be omitted or replaced by an entirely different method of access.

Optionally, news or information about plays may be presented to viewers who have not formally logged in, for example, in the form of a Blog such as the one illustrated in Graphic 16 including commentary and analysis of plays run in business, politics and popular culture, in order to familiarize potential users with the concept of plays and the encompassing discipline the inventor calls "playmaking." The blog may also be accessible only after formal login, after a guest login, or any other method of access.

Once logged in, the user may access an illustration of the above-mentioned five step methodology, which is called "the play makers process" and is illustrated in Graphic 18. Of course, the methodology may be divided into less than or more than five steps, or steps may be added or deleted, and it is also possible to completely omit the screen represented by Graphic 18 if user's are familiar with the methodology or capable of utilizing the taxonomic table and whiteboard described below without specific guidance.

The first stage of the five step methodology is referred to as "fit and friction," illustrated in Graphic 19, and involves the identification of a source of agreement or disagreement to which the player can attach its play action plans. The idea might be something wholly agreeable, such as an alternative fuel technology or steroid testing (fit). Likewise, it might be something considered controversial, such as a bigger, heavier SUV or public school prayer (friction). In any case, this step may be omitted if the goal is only to decode and respond to the play(s) of a competitor or rival.

The second step is to select or "call" the play, using the playmaker's table of Graphic I, according to the following steps:

1. select a class (assess, condition, or engage, in the illustrated example);
2. select a subclass;
3. select a play by reviewing specific play options, referring to definitions, upsides, downsides, examples, and countermeasures as necessary.

Those skilled in the art will appreciate that one can also go to the plays directly without first selecting a class and subclass, although the organization of the table into categories of increasing confrontation and difficulty of implementation is intended to help the user focus on plays of interest, depending on the degree of confrontation desired by the user and the user's resources.

The third step is to actually undertake or "run" the selected play. This step does not involve use of the website, but rather involves actually taking steps in the real world to carry out the play through supporting tactics.

The first three steps of the methodology are illustrated in the following example, in which Wal-Mart determined that it would be beneficial to have a higher government mandated minimum wage since it already paid well over the minimum wage, so that asking for a higher wage would result in good publicity. The play that Wal-Mart ultimately selected was a "screen" (under the "frame" subclass and "condition" class), implemented in the form of a speech to congress and illustrated in the following table:

| Wal-Mart Runs a Screen | |
|---|---|
| The Player | Wal-Mart |
| The Fit | Higher Minimum Wage |
| The Friction | N/A |
| Class/Subclass/Play | Condition/Frame/Screen |
| Tactic Employed? | Speech |
| Where was the play run? | Capitol, Washington, D.C. |
| Who was the play run with or on? | Members of Congress |
| When was the play run? | In the midst of Wal-Mart's well-publicized PR offensive |

Once the play has been run, the methodology suggests a pause play to assess the results of running the play, consequences (foreseen and unforeseen), responses of others, whether the play is working, and so forth. The fifth step illustrated in Graphic 18 is to run a pass (withdrawal, as explained below), or to keep going by continuing with the same and/or other plays.

To assist in the identification and selection of plays, the user may access a feature entitled "factors at play," which is a third of the three parts of the system of the invention as described above, and which is illustrated in Graphic 20. The factors at play feature is in the form of a reference table of marketplace variables that enables playmakers, i.e., strategists or planners, to separate the plays they run from the game they play and all of its attendant rules, quirks, conditions, and hazards. The factors are not plays per se, but rather influences upon plays, and are divided into tangibles, intangibles, communication, policies, stakeholders, and x-factors.

Tangible factors include items that are known and easily measured or counted, such as the player's or a rival's capital assets, financial assets, intellectual property, products, and services. Intangible factors include items that are known, but not easily measured or benchmarked including brand, credibility, culture, goodwill, knowledge, loyalty, relationships, reputation, satisfaction, skills, time, and trust. Communication involves balance, breadth, clarity, consistency, depth, frequency, speed, tone, and volume. Policies influence how one makes judgments, decisions, and take action, and include access, attribution, ethics, guidelines, laws, and regulations. Stakeholders are those affected by or involved in the plays, including community, competitors, customers, distributors, employees, executives, investors, legislators, managers, media, partners, and regulators. Finally, x-factors include items that cannot be known, such accidents, deaths, deceit, gifts, and good or bad luck. Each of these lists of factors is by way of example and not limitation, and factors may be added or omitted without departing from the scope of the invention.

In the preferred embodiment, actual development of a strategy or sequence of plays is carried out on a template or "whiteboard," illustrated in Graphic 22, which may be accessed through the home page of Graphic 21, after login. The whiteboard is used to create, store, publish, share, and collaboratively update illustrations of the plays that are run in any marketplace, and is the starting point for the development of a play action map. In the preferred embodiment, the whiteboard enables plays to be plotted along a timeline to illuminate the patterns, sequences, trends and tendencies of marketplace play action, including moves that have been made and others that are planned.

The following discussion refers to "clicking" and "double clicking" for the purpose of selecting "icons." It is to be understood, however, that use of mouse clicks or double clicks, which is commonly associated with the Microsoft Windows™ operating system, is but one way of selecting an image or object on a display. The invention is of course not limited to a particular "selection" technology or operating system. For example, selection might involve a touch pad, stylus, or voice commands.

As illustrated in Graphic 22, the whiteboard provides space for creating a new play action map by arranging play icons above or below a line separating the playmaker from rivals or opponents, in a temporal sequence extending horizontally. Initially, a form is displayed to permit entry of a title, playmaker information, and a synopsis of the play sequence or map, as illustrated in Graphics 23 and 24. At this time, saved plays may also be recalled for review or editing (Graphic 23).

Upon entry of basic information, the user selects a play, surrogate or information bubble, as illustrated in Graphic 25. Graphic 26 shows a blank information bubble, which is invoked by selecting the exclamation point icon at the bottom of the screen and filled in by the playmaker to set the stage for the play action map and its selected play types. Graphic 27 shows information entered by the user into the information bubble. Graphic 28 shows that the user has called up the playmaker's table and that the user is considering the selection of a play type called "crowd," information about which is displayed when the user locates his cursor over the corresponding "crowd" icon in the table.

By double-clicking on the icon, further details of the play's (or surrogate's) capabilities and characteristics, including its rated risks and reward, definition, lists of related plays and terms, case examples, and suggested upsides, downsides, best uses and means for decoding and countering the play, may be accessed through the "flash card" shown in Graphics 29-35, each of which includes a menu or hyperlink for calling corresponding text and/or graphics to help explain the play.

For example, in Graphic 29, the user has selected "countering," which lists plays that can be taken or "run" to counter the "crowd" play, including hyperlinks in blue to the corresponding plays. Graphic 30 show an expandable risk/reward table at upper left. In Graphic 31, the user has selected "decoding" for information on how to determine whether an opponent is running the crowd play, while Graphic 32 shows a screen in which the user has selected upsides. Graphic 32 shows selection of downsides, Graphic 33 shows selection of best practices for running the crowd option, and Graphic 34 shows that the user has selected "examples" at the bottom right side of the flash card.

Another example, which is not illustrated in the figures but might help explain the manner in which information on a play is obtained, is the example in which the flash card is associated with a "pass" play. Initially, upon location of a cursor or pointer over the pass icon, the user will be presented with a definition of pass. Clicking on the pass icon, or otherwise selecting the icon, will result in the display of a flash card listing the several types of information that may be displayed including, as in the illustrated crowd example, information on upsides, downsides, related terms and play types, as well as examples, identifying characteristics, and counterplays.

In the case of a pass, upsides may be that the pass play conserves resources to create new competitive options, conditions the player to choose its shots carefully, not to try to win every battle, and cut losses. The downsides might be that the pass play proves a competitor's or rival's superiority and damages a player's competitive reputation. Related terms include aborting, bailing, cutting losses, ejecting, exiting, retreating, and surrendering. Related play types might include deflect and pause.

Displayed examples of the pass plays might include IBM's sale of its PC business to a Chinese company in order to concentrate on higher-margin businesses with greater strategic value, Khrushchev's letter to President Kennedy announcing withdrawal of missiles after the Cuban missile crisis of 1962, and Dave Chappelle's withdrawal from Comedy Central's highly rated Chappelle's show.

The option entitled "calling and running" the play might give reasons for running the pass play, including the need to refocus, avoiding being overtaken or stopping the loss of resources, and so forth, while the option entitled "decoding and countering" the pass might include examples of how to recognize that the pass is being run on the player, such as being approached by a rival seeking concessions for its possible exit, or that an opponent disappears from view.

Counters to a pass include running a pause (making sure that the apparent pass is not really a red herring), bait (inviting weaker competitors into the marketplace to help keep out main rival), recast (congratulating the exiting competitor to focus attention on what the player is doing right), or peacock (letting the marketplace know that you drove out competition). Similar information is provided for each of the plays and surrogates listed in the table.

Upon selection of the play or surrogate, the user is prompted to described the circumstances surrounding the selected play, as illustrated in Graphics 36 and 37. The user is also provided with a selection of recommended counterplays that display upon location of the cursor over the icons, as illustrated in Graphic 38, and that may be selected to call up flash cards for the selected icon, such as the icon representing the "label" play as illustrated in Graphics 39 and 40, or that may be selected and directly applied to the whiteboard.

The map thus created utilizing the whiteboard and taxonomic table of plays may then be saved, as illustrated in Graphic 41, via a dialog box that allows saving of plays or recall of earlier generated maps as well as administrator-created examples.

Graphics 42-50 illustrate an administrator-created example, in which the play-making concepts described above have been applied to an actual event popularly known as "Rathergate," involving a confrontation between CBS anchorman Dan Rather and conservative critics. Graphics 42-50 respectively show the overall map, and mirror, mirror+proxy, mirror+proxy, call out, red herring+proxy, recast, deflect, and disco plays run by Mr. Rather and his opponents during the confrontation in years 2004 and 2005. FIG. 51 shows an analysis of the plays run in the "Rathergate" example by frequency, with different colors representing the two parties to the confrontation, and Graphic 52 shows an annotated version of a different representation that is in the form of a .pdf formatted document suitable for printing or electronic distribution.

Having thus described a preferred embodiment of the invention in sufficient detail to enable those skilled in the art to make and use the invention, it will nevertheless be appreciated that numerous variations and modifications of the illustrated embodiment may be made without departing from the spirit of the invention, and it is intended that the invention not be limited by the above description or accompanying drawings, but that it be defined solely in accordance with the appended claims.

What is claimed is:

1. A system comprising a computing device, a display, and software implemented by said computing device for controlling the display in order to assist a user in the development of courses of action or strategies, said software comprising:
   instructions for enabling the use to select a plurality of icons or symbols that represent strategies or plays to be carried out by or on behalf of an individual or organization, wherein said icons or symbols are arranged in groups according to degree of confrontation and/or ease of execution, said instructions for enabling the user to select a plurality of icons or symbols including instructions for executing the following display-controlling steps:
   (a) displaying a plurality of icons or symbols that represent irreducible strategems or "plays" to be carried out by, or on behalf of, an individual or organization, said icons of symbols being arranged in a taxonomic table divided into a number of groups, categories, or classes arranged according to a degree of confrontation or ease of execution, each group, category, or class containing one or more plays;
   (b) upon selection by a user of one of the groups, categories, or classes, displaying definitions and information on the selected group, category, or class;
   (c) displaying subgroups associated with the selected group, category, or class, and icons or symbols included in the displayed subgroups;
   (d) upon selection by a user of one of the icons or symbols in a group, category, or subgroup, displaying definitions and information on the plays, said information including any combination of: related plays or terms, case examples, upsides and downsides, best uses, and/or guidelines and best practices for decoding, counteracting, and complementing the plays;
   (e) enabling icons or symbols representing plays selected by the user to be manipulated in order to illuminate patterns, trends, tendencies, and sequences of marketplace strategic influence activity, thereby enabling a user to anticipate consequences of executing the selected plays.

2. A system as claimed in claim 1, further comprising a list of decision making factors displayed on said display for assisting in selection of said plays.

3. A system as claimed in claim 1, wherein said groups are arranged along a first axis by degree of confrontation and along a second axis by ease of execution.

4. A system as claimed in claim 1, wherein said symbols or icons are each associated with a play definition displayed in a text box upon selection of a corresponding symbol or icon.

5. A system as claimed in claim 1, wherein said symbols or icons are associated with flash cards that are displayed upon selection of a corresponding symbol or icon, and that include links to various categories of information about the corresponding symbol or icon.

6. a system as claimed in claim 1, wherein said symbols or icons are arranged to be selected and plotted in sequence on a displayed whiteboard.

7. A system as claimed in claim 6, wherein associated with said displayed whiteboard is an icon for causing display of a form enabling input of information concerning the sequence or frequency of plays selected from the table and plotted in sequence on the whiteboard.

8. A system as claimed in claim 6, wherein said whiteboard includes a timeline with which said plays plotted in sequence on the whiteboard are associated.

9. A system as claimed in claim 6, wherein said plays plotted in sequence on the whiteboard are also arranged by party.

10. A system as claimed in claim 1, wherein said plays are categorized by classes and subordinated sublcasses, each including a particular type of play.

11. A system as claimed in claim 10, wherein said classes include at least one of "assess," "condition," and "engage" classes of plays, said "assess" class including plays involving monitoring and profiling of players and marketplaces, said "condition" class including plays involving encouragement or suppression of actions to influence or reform sentiments of players and marketplaces, and said "engage" class includes plays involving actions that destabilze players and marketplaces, assert leadership, or invite competitive responses.

12. A system as claimed in claim 11, wherein said assess class is further categorized by subclasses including "detach" plays, in which a player exits a marketplace, and "test" plays in which the player sizes up issues, events, developments, and ideas, and forecasts a player's wishes or needs.

13. A system as claimed in claim 12, wherein said detach subclass includes a "pass" play involving stretgic withdrawal from a marketplace or play action, and a "pause" play involving suspension of activity to assess the marketplace or let conditions develop/risen.

14. A system as claimed in claim 12, wherein said test subclass includes a "ping" play, in which the player sends an oblique reference or suggestion to the marketplace, either by mere presence or an implied interest in topics, ideas, event, and developments, in order to evaluate a resulting reaction without direct engagement, and a "trial balloon" play, which involves preview and testing of preliminary ideas or tentative plans, often without attribution or on a temporary basis.

15. a system as claimed in claim 11, wherein said condition class includes a divert subclass including plays that distract a player or reroutes an intended course of action, a frame subclass including plays that adjust criteria of contexts and actions in the marketplace, and a freeze subclass including plays that inhibit movement and moties of competitors and prevents further erosion of a player's position.

16. a system as claimed in claim 15, wherein said divert subclass includes a "deflect" play, in which a player seeks to divert a rival's attach to avoid or minimize impact, a "leak" play, in which a player selectively discloses normally privileged or confidential information to a specified target in order to divert or accentuate a developing idea in the marketplace, and a "red herring" play in which an action is taken to draw an opponent away from its preferred position or intended course of action.

17. a system as claimed in claim 15, wherein said frame sublcass includes a "filter" play, in which information is selectively re-transmitted to build or defend a position, a "recast" play, in which an action, event, information, message, or symbol is reinterpreted so as to lend support for a player's position or agenda, or neutralize or weaken a position or agenda of a rival, a "label" play, in which a word or phrase is self-given by a player or attributed to an opponent to reshape or deepen the meaning of the recipient's position, brand, or reputation, and a "screen" play, in which a player borrows issues, ideas, events or other symbolic references to advance the player's agenda or thwart competitive movements.

18. a system as claimed in claim 15, wherein said freeze subclass includes a "mirror" play, in which new facts or information is introduced into a marketplace to contradict a rival's position or point of view, a "jam" play, in which the player attempts to disable or disorganize a rival's activities or communications and/or receipt of information, a "bear hug" play, which involves a conspicuously public embrace of an opponent's position or message, a "lantern" play, which involves a preemptive disclosure by a player of its own flaw, mistake, or other source of potential embarrassment or controversy, and a "disco" play, in which a player sacrifices an element of its platform in order to preserve or advance its overall agenda or argument (one step back, two steps forwards).

19. a system as claimed in claim 11, wherein said engage class includes a lure subclass, in which an opponent is dared to take an action, a press subclass, in which a player employs authority, ability or audacity to establish a position, and an attack subclass, in which a player commits to compete directly for a desired position.

20. a system as claimed in claim 19, wherein said lure subclass includes a "challenge" play, which is a public appeal, suggestion or demand by a player, designed to mobilize and/or inspire a person, organization or broader constituency to consent or take action to benefit the player, and a "bait" play, which is an overt provocation of an opponent through action or information, intended to draw an emotional rather than rational response.

21. A system as claimed in claim 20, wherein said press subclass includes a "fiat" play, which is a declaration of information or demonstration of capability to a marketplace in order to shift a competitive dynamic, a "crowd" play, which is an attempt by a player to match or adopt an opponent's position in a maretkplace, and a "peacock" play, which is an attempt by a player to bring attention to itself by an unusual action, innovation, or precedent-setting development.

22. a system as claimed in claim 20, wherein said attack subclass includes a "call out" play, which is an overt public expression of doubt or concern intended to call into question a flaw in the opponent's position or message st, a "preempt" play, which is an action that reverses competitive position in a way that surprises and disables the competiton, a "draft" play, which is an attempt by a player to feed off the energy of a developing marketplace, innovation or best practice with the intention of overtaking leaders, and a "crazy ivan" play, which alters the course or circumstances of an impending attack by inviting or initiating the attack.

23. A system as claimed in claim 11, further comprising a surrogate grouping that includes a "partner" surrogate, in which the player aligns with a third party who operates as a co-equal in pursuit of a common agenda or business purpose, a "proxy" surrogate, in which an associate advocates for an supports the agenda of a player, but conveys a sens of free-will and independence, and a "plant" surrogate, in which a trusted and confidential ally, usually disguised or undisclosed to the opponent, seeds or senses information in the marketplace.

24. A method for assisting in the analysis, development, or analysis and development of courses of action or strategies, implemented by means of a computing device and a display, comprising the steps of:

(a) displaying a plurality of icons or symbols that represent irreducible strategems or "plays" to be carried out by, or on behalf of, an idividual or organization, said icons or symbols being arranged in a taxonomic table divided into a number of groups, categories, or classes arranged according to degree of confrontation and/or ease of execution;

(b) upon selection by a user of one of the groups, categories, or classes, displaying definitions and information on the selected group, category or class;

(c) displaying subgroups associated with a selected group, category, or class, and icons or symbols included in the displayed subgroups;

(d) upon selection by a user of one of said icons or symbols, displaying definitions and information on the plays, said information including any combination of: related plays or terms, case examples, upsides and downsides, best uses, and/or guidelines and best practices for decoding, counteracting, and complementing the plays;

(e) enabling icons or symbols representing plays selected by the user to be manipulated in order to illuminate patterns, trends, tendencies, and sequences of marketplace play action, thereby enabling a user to anticipate consequences of executing the selected plays.

25. A method as claimed in claim 24, further comprising the step of displaying a template that includes means for inputting information concerning said course of action or strategy, including a title and players.

26. A method as claimed in claim 24, further comprising the step of displaying a list of decision making factors displayed on said display for assisting in selection of said plays.

27. A method as claimed in claim 24, wherein said groups are arranged along a first axis by degree of confrontation and along a second axis by ease of execution.

28. A method as claimed in claim 24, wherein said symbols or icons are each associated with a play definition displayed in a text box upon selection of a corresponding symbol or icon.

29. A system as claimed in claim 24, wherein said symbols or icons are associated with flash cards that are displayed upon selection of a corresponding symbol or icon, and that include links to various categories of information about the corresponding symbol or icon.

30. A method as claimed in claim 29, wherein said categories of information include any combination of related plays or terms, case examples, suggested upsides, downsides, best uses, means for decoding a play, and means for countering a play.

31. A method as claimed in claim 24, wherein said symbols or icons are arranged to be selected and pasted in sequence to a displayed whiteboard.

32. A method as claimed in claim 31, wherein associated with said displayed whiteboard is an icon for causing display of said taxonomic table, and an icon for causing display of a form enabling input of information concerning the sequence of plays selected from the table and pasted to the whiteboard.

33. A method as claimed in claim 31, wherein said whiteboard includes a timeline with which said pasted plays are associated.

34. A method as claimed in claim 31, wherein said pasted plays are also arranged by party.

35. A method as claimed in claim 24, wherein said plays are categorized by classes, each including a particular type of play.

36. A method as claimed in claim 35, wherein said classes include at least one of "assess," "condition," "engage," classes of plays, said "assess" class including plays involving monitoring and profiling of players and marketplaces, said "condition" class including plays involving encouragement or suppression of actions to influence or reform sentiments of players and marketplaces, and said "engage" class includes plays involving actions that destabilize players and marketplaces, assert leadership, or invite competitive responses.

37. A method as claimed in claim 36, wherein said assess class is further categorized by subclasses including "detach" plays, in which a player exits a marketplace, and "test" plays in which the player sizes up issues, events, developments, and ideas, and forecasts a player's wishes or needs.

38. A method as claimed in claim 37, wherein said detach subclass includes a "pass" play involving strategic withdrawal from a marketplace or play action, and a "pause" play involving suspension of activity to assess the marketplace or let conditions develop/ripen.

39. A method as claimed in claim 37, wherein said test subclass includes a "ping" play, in which the player sends an oblique reference or suggestion to the marketplace, either by mere presence or an implied interest in topics, ideas, event, and developments, in order to evaluate a resulting reaction without direct engagement, and a "trial balloon" play, which involves preview and testing of preliminary ideas or tentative plans, often without attribution or on a temporary basis.

40. A method as claimed in claim 36, wherein said condition class includes a divert subclass of plays that distract a player or reroutes an intended course of action, a frame subclass of plays that adjust criteria of contexts and actions in the marketplace, and a freeze subclass of plays that inhibit movement and motives of competitors and prevents further erosion of a player's position.

41. A method as claimed in claim 40, wherein said divert subclass includes a "deflect" play, in which a player seeks to divert a rival's attack to avoid or minimize impact, a "leak" play, in which a player selectively discloses normally privileged or confidential information to a specified target in order to divert or accentuate a developing idea in the marketplace, and a "red herring" play in which an action is taken to draw an opponent away from its preferred position or intended course of action.

42. A method as claimed in claim 40, wherein said frame subclass includes a "filter" play, in which information is selectively re-transmitted to build or defend a position, a "recast" play, in which an action, event, information, message, or symbol is reinterpreted so as to lend support for a player's position or agenda, or neutralize or weaken a position or agenda of a rival, a "label" play, in which a word or phrase is self-given by a player or attributed to an opponent to reshape or deepen the meaning of the recipient's position, brand, or reputation, and a "screen" play, in which a player borrows issues, ideas, events or other symbolic references to advance the player's agenda or thwart competitive movements.

43. A method as claimed in claim 40, wherein said freeze subclass includes a "mirror" play, in which new facts or information is introduced into a marketplace to contradict a rival's position or point of view, a "jam" play, in which the player attempts to disable or disorganize a rival's activities or communications and/or receipt of information, a "bear hug" play, which involves a conspicuously public embrace of an opponent's position or message, a "lantern" play, which involves a preemptive disclosure by a player of its own flaw, mistake, or other source of potential embarrassment or controversy, and a "disco" play, in which a player sacrifices an element of its platform in order to preserve or advance its overall agenda or argument (one step back, two steps forwards).

44. A method as claimed in claim 36, wherein said engage class includes a lure subclass, in which an opponent is dared to take an action, a press subclass, in which a player employs authority, ability or audacity to establish a position, and an attack subclass, in which a player commits to compete directly for a desired position.

45. A method as claimed in claim 44, wherein said lure subclass includes a "challenge" play, which is a public appeal, suggestion or demand by a player, designed to mobilize and/or inspire a person, organization or broader constituency to consent or take action to benefit the player, and a "bait" play, which is an overt provocation of an opponent through action or information, intended to draw an emotional rather than rational response.

46. A method as claimed in claim 45, wherein said press subclass includes a "fiat" play, which is a declaration of information or demonstration of capability to a marketplace in order to shift a competitive dynamic, a "crowd" play, which is an attempt by a player to match or adopt an opponent's position in a marketplace, and a "peacock" play, which is an attempt by a player to bring attention to itself by an unusual action, innovation, or precedent-setting development.

47. A method as claimed in claim 45, wherein said attack subclass includes a "call out" play, which is an overt public expression of doubt or concern intended to call into question a flaw in the opponent's position or message st, a "preempt" play, which is an action that reverses competitive position in a way that surprises and disables the competition, a "draft" play, which is an attempt by a player to feed off the energy of a developing marketplace, innovation or best practice with the intention of overtaking leaders, and a "crazy ivan" play, which alters the course or circumstances of an impending attack by inviting or initiating the attack.

48. A method as claimed in claim 36, further comprising a surrogate grouping that includes a "partner" surrogate, in which the player aligns with a third party who operates as a co-equal in pursuit of a common agenda or business purpose, a "proxy" surrogate, in which an associate advocates for an supports the agenda of a player, but conveys a sense of freewill and independence, and a "plant" surrogate, in which a trusted and confidential ally, usually disguised or undisclosed to the opponent, seeds or senses information in the marketplace.

* * * * *